(12) United States Patent
Iwamoto

(10) Patent No.: US 11,300,763 B2
(45) Date of Patent: Apr. 12, 2022

(54) OPTICAL SYSTEM AND IMAGING APPARATUS

(71) Applicant: CANON KABUSHIKI KAISHA, Tokyo (JP)

(72) Inventor: Shunji Iwamoto, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/984,627

(22) Filed: Aug. 4, 2020

(65) Prior Publication Data
US 2021/0041665 A1    Feb. 11, 2021

(30) Foreign Application Priority Data

Aug. 6, 2019   (JP) .............................. JP2019-144633
May 25, 2020   (JP) .............................. JP2020-090687

(51) Int. Cl.
   *G02B 13/00*   (2006.01)
   *G02B 7/04*    (2021.01)

(52) U.S. Cl.
   CPC ........... *G02B 13/0035* (2013.01); *G02B 7/04* (2013.01)

(58) Field of Classification Search
   CPC .......... G02B 9/10; G02B 9/12; G02B 13/003; G02B 13/0035
   See application file for complete search history.

(56) References Cited

U.S. PATENT DOCUMENTS

| | | | |
|---|---|---|---|
| 2009/0185026 A1 | 7/2009 | Choi | |
| 2017/0351060 A1* | 12/2017 | Sugita | .................. G02B 15/143 |
| 2019/0094503 A1 | 3/2019 | Saito | |

FOREIGN PATENT DOCUMENTS

| | | |
|---|---|---|
| CN | 107450165 A | 12/2017 |
| CN | 107450169 A | 12/2017 |
| EP | 2244116 A1 | 10/2010 |
| JP | 2019-008047 A | 1/2019 |
| WO | 2018/088038 A1 | 5/2018 |

* cited by examiner

*Primary Examiner* — Joseph P Martinez
(74) *Attorney, Agent, or Firm* — Canon U.S.A., Inc. IP Division

(57) ABSTRACT

An optical system includes one or more positive lenses and one or more negative lenses. The first positive lens is a positive lens disposed closest to an object among the one or more positive lenses. The first negative lens is a negative lens that is disposed on an image side of the first positive lens and disposed closest to the object among the one or more negative lenses. At least one of an object side surface and an image side surface of the first positive lens is an aspherical surface. At this time, a relationship between a total lens length of the optical system L0, a focal length of the optical system L0, and a distance Dpn on an optical axis from the image side surface of the first positive lens to an object side surface of the first negative lens is defined.

22 Claims, 18 Drawing Sheets

OPTICAL SYSTEM AND IMAGING APPARATUS

BACKGROUND OF THE INVENTION

Field of the Invention

The present invention relates to an optical system and an imaging apparatus.

Description of the Related Art

An optical system used in an imaging apparatus is demanded to be compact and lightweight as the entire system, and have high optical performance that can satisfactorily correct various types of aberration including chromatic aberration. As an optical system having a compact configuration as the entire system, there has been known a telephoto-type optical system in which an optical system having positive refractive power is disposed on an object side, and an optical system having negative refractive power is disposed on an image side. Nevertheless, in the telephototype optical system, an optical system upsizes as a focal length becomes longer, and the use of a large-diameter lens or a heavy lens makes the weight of the entire optical system more likely to increase.

Japanese Patent Application Laid-Open No. 2019-8047 discusses an optical system of which the weight is saved by devising a configuration of a lens disposed on an object side of a stop.

Methods for achieving further weight saving of an optical system generally include a method of reducing the number of lenses included in an optical system, and a method of forming an optical system using lenses having weak refractive power. Nevertheless, in the former case, refractive power of each lens becomes stronger and various types of aberration become more likely to deteriorate, and in the latter case, a total lens length of an optical system becomes longer, and the optical system becomes more likely to upsize.

SUMMARY OF THE INVENTION

The present invention has been contrived in view of the above-described issues, and is directed to provide an optical system that is compact and lightweight and has a high optical property.

According to an aspect of the invention, an optical system includes one or more positive lenses, and one or more negative lenses, wherein a positive lens disposed closest to an object among the one or more positive lenses is a first positive lens, and a negative lens that is disposed on an image side of the first positive lens and disposed closest to the object among the one or more negative lenses is a first negative lens, wherein at least one of an object side surface and an image side surface of the first positive lens is an aspherical surface, and wherein the following conditional expressions are satisfied:

$0.20 < LD/f < 1.00$, and $0.382 < Dpn/LD < 0.800$, where LD is a total lens length of the optical system, f is a focal length of the optical system, and Dpn is a distance on an optical axis from an image side surface of the first positive lens to an object side surface of the first negative lens.

Further features of the present invention will become apparent from the following description of exemplary embodiments with reference to the attached drawings.

DESCRIPTION OF THE EMBODIMENTS

Figure 1:
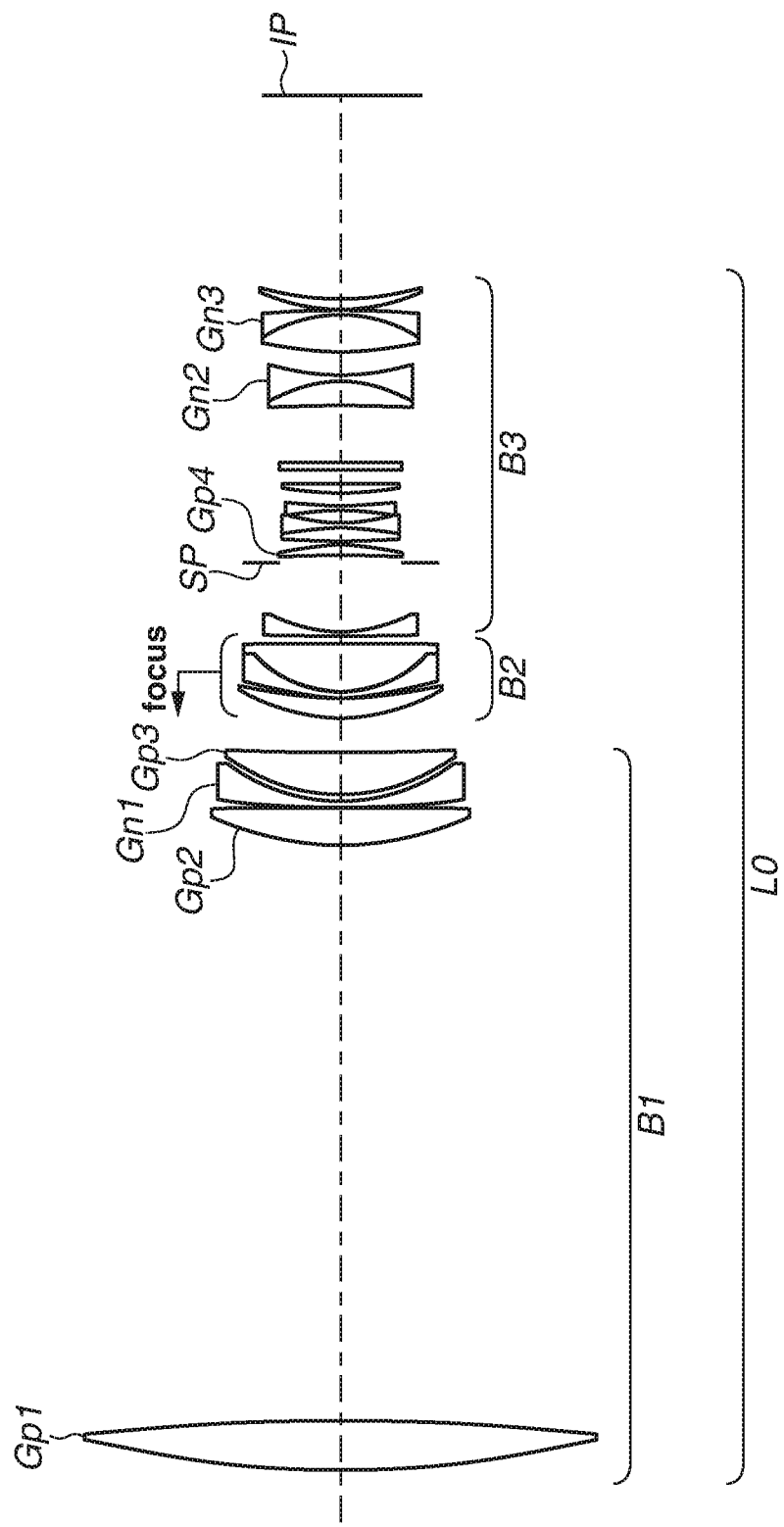
FIG. 1 is a cross-sectional view of an optical system according to a first embodiment.
Figure 2:
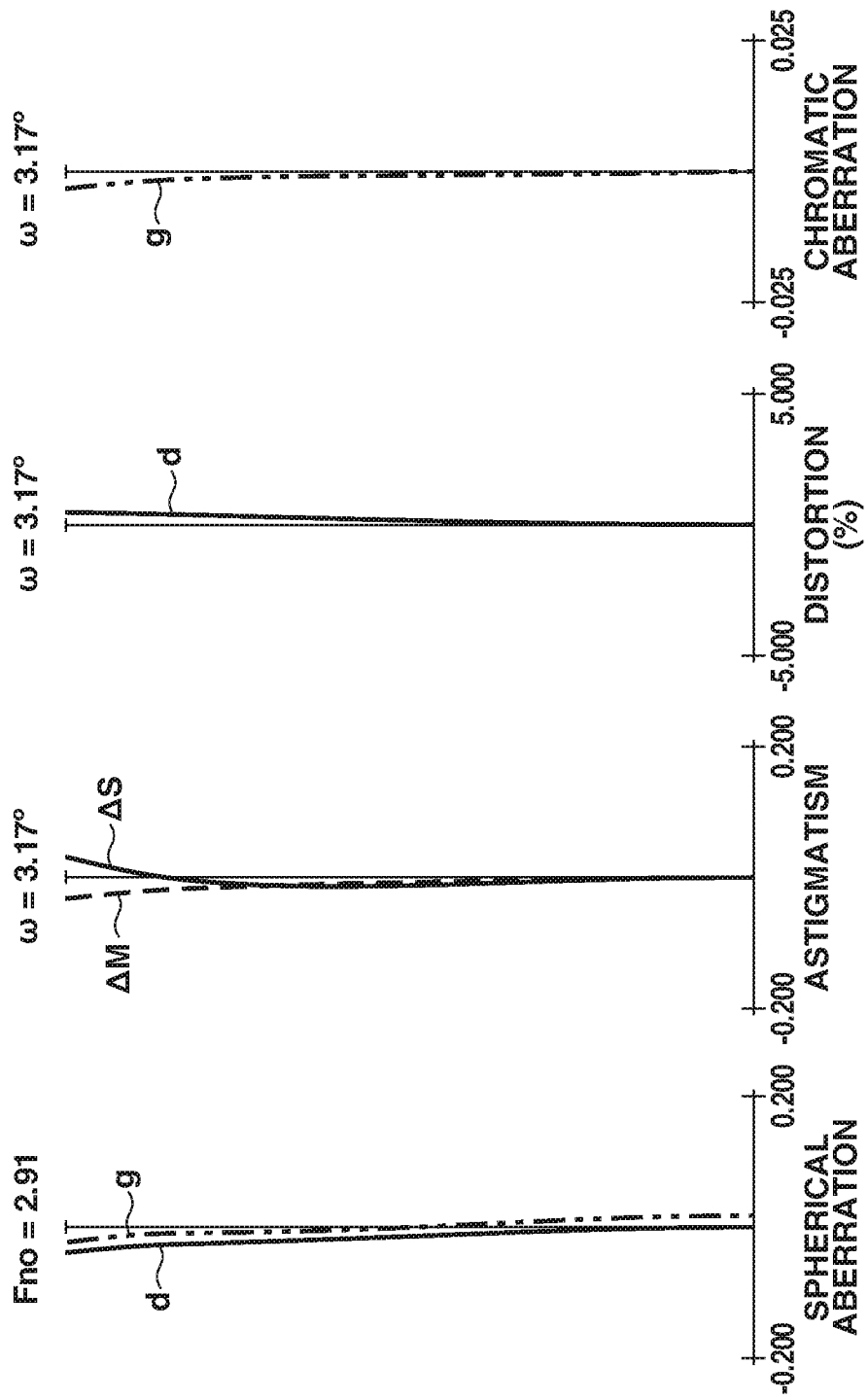
FIG. 2 is an aberration diagram of the optical system according to the first embodiment.
Figure 3:
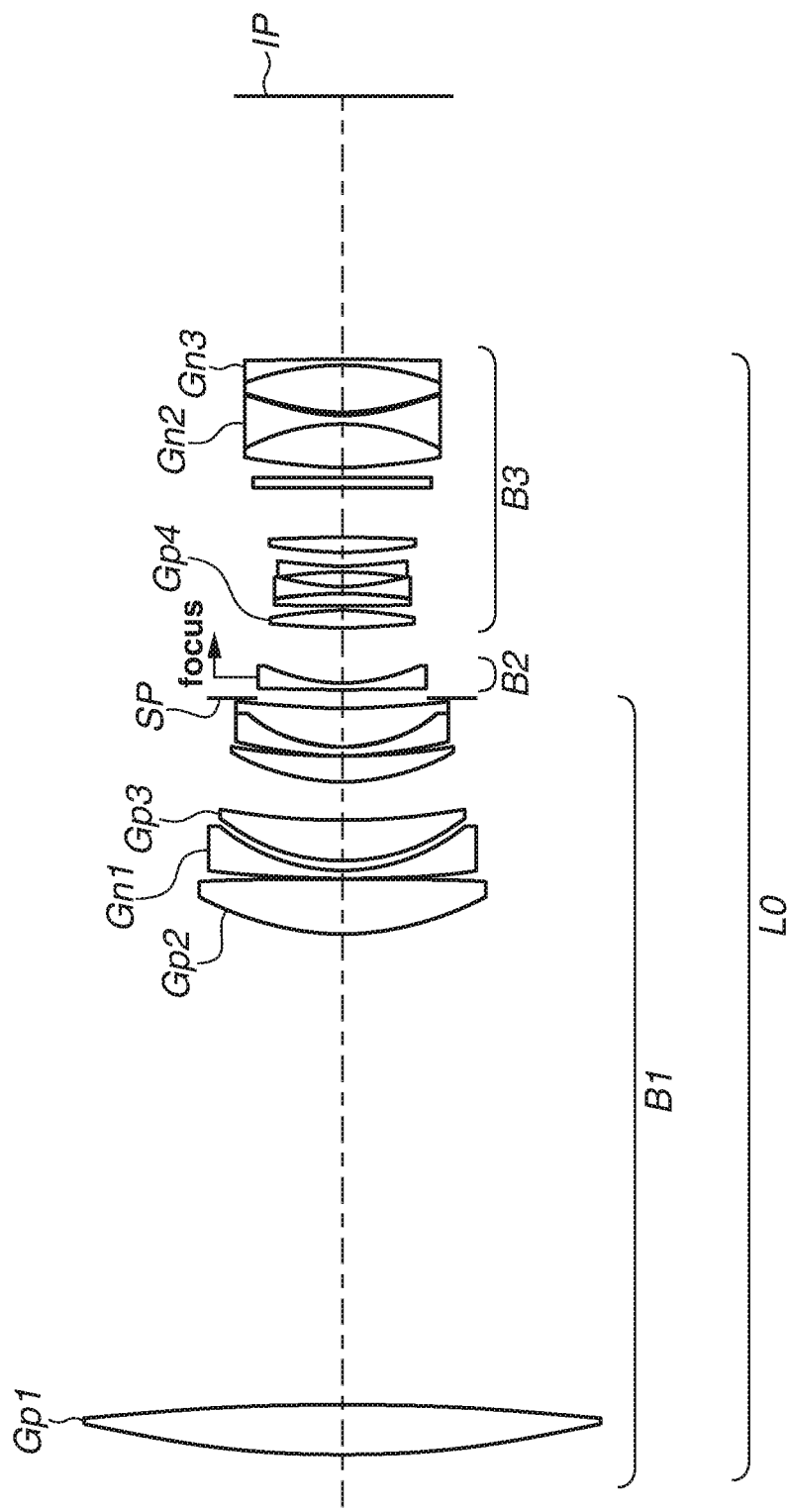
FIG. 3 is a cross-sectional view of an optical system according to a second embodiment.
Figure 4:
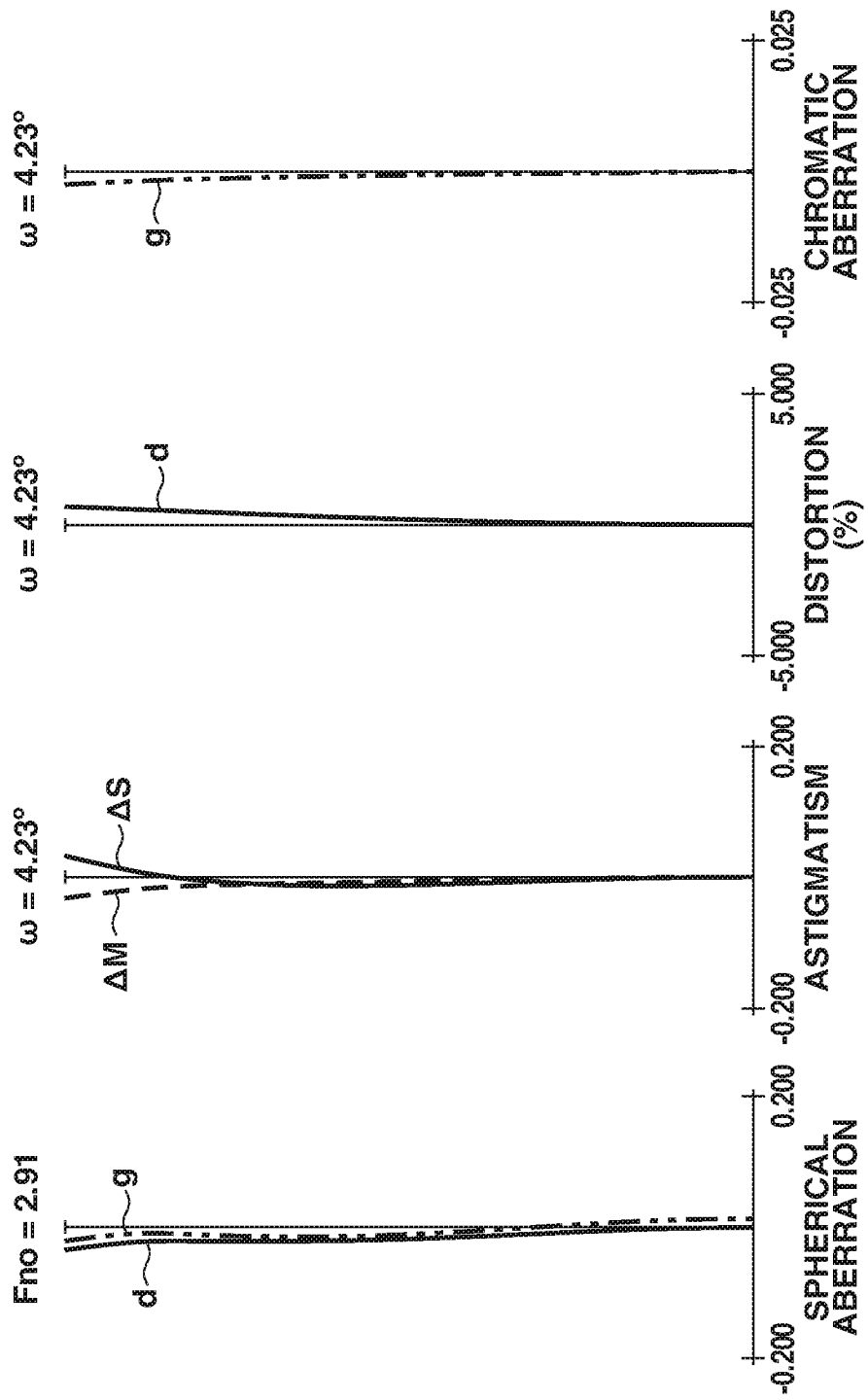
FIG. 4 is an aberration diagram of the optical system according to the second embodiment.
Figure 5:
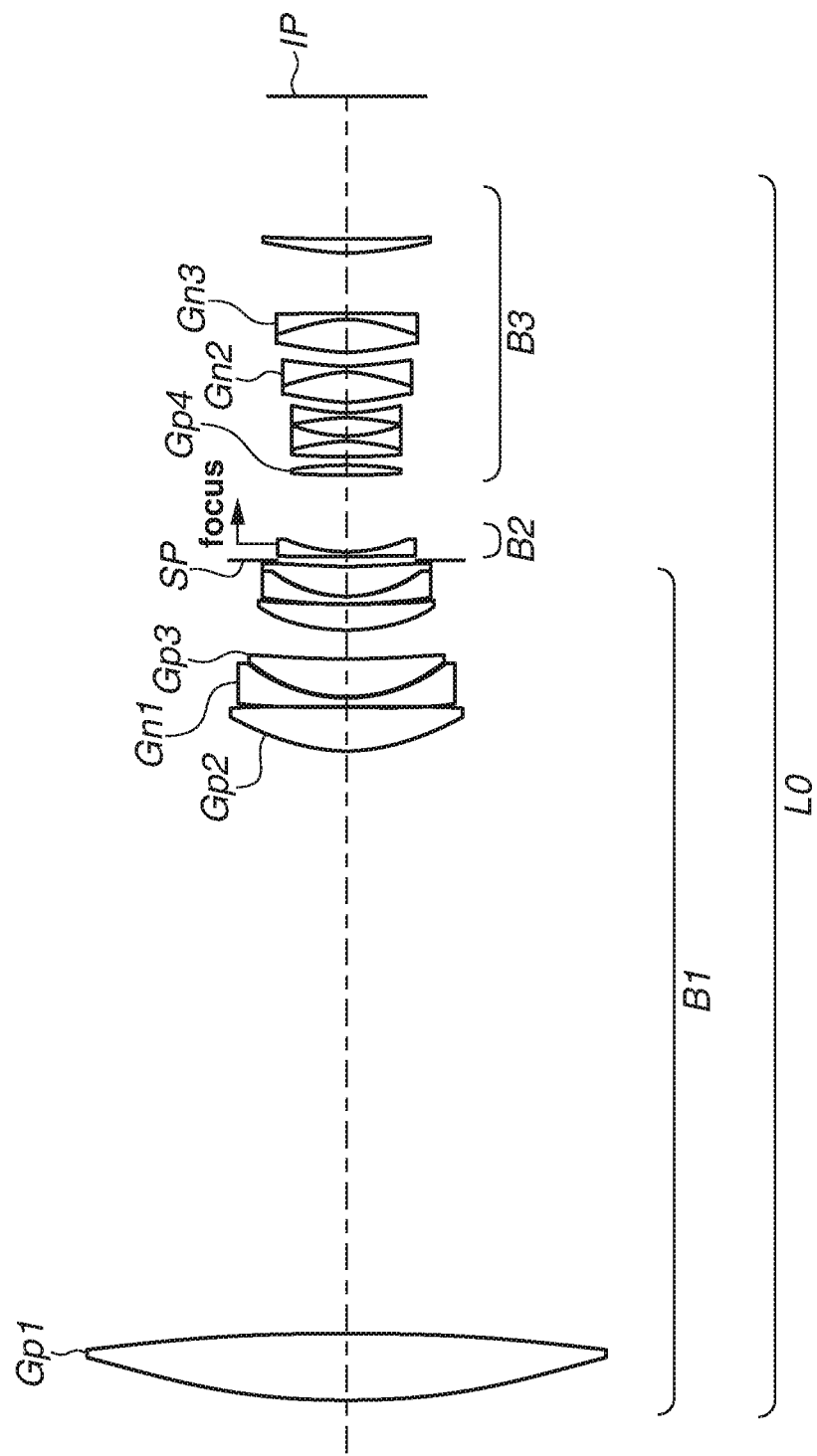
FIG. 5 is a cross-sectional view of an optical system according to a third embodiment.
Figure 6:
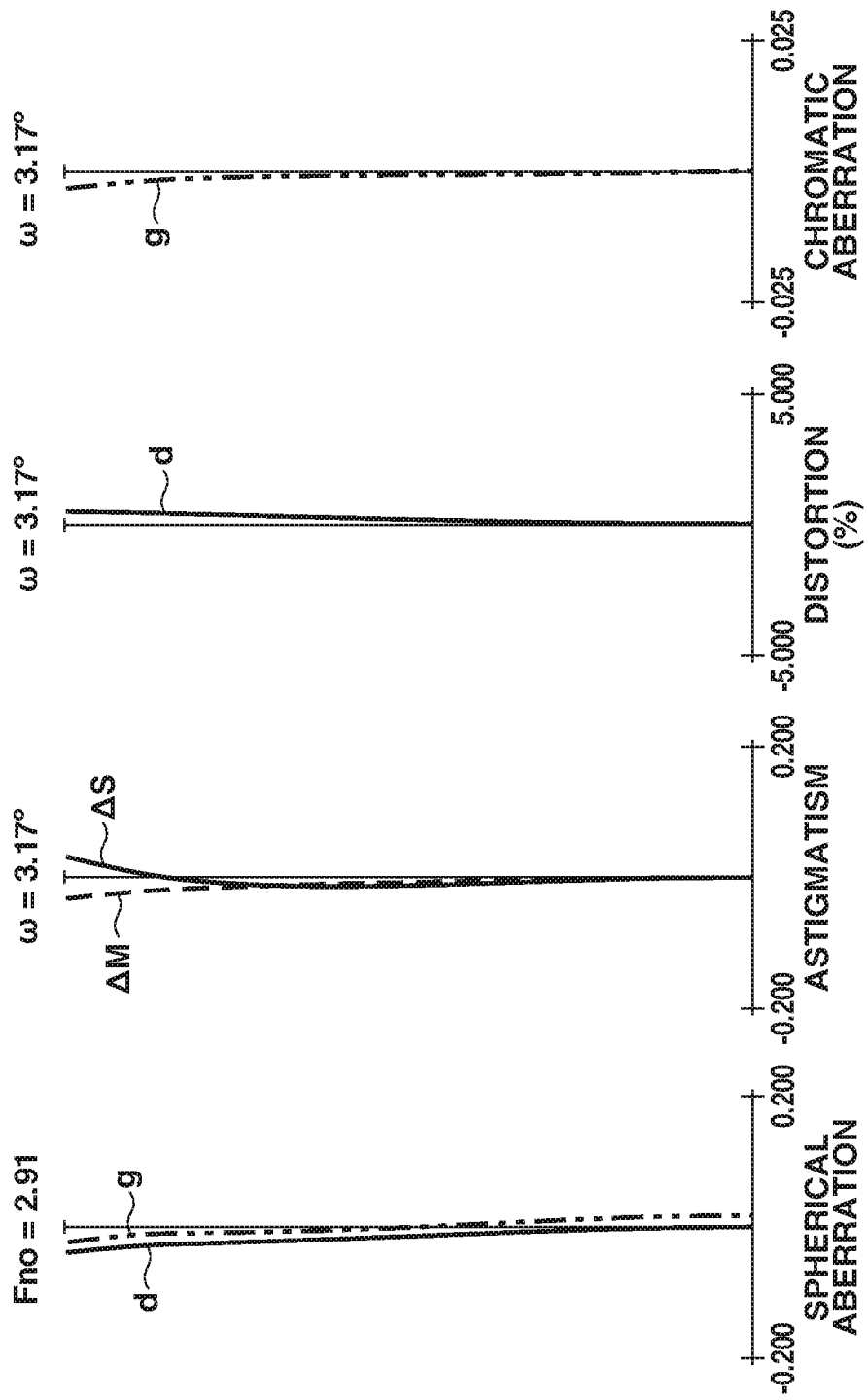
FIG. 6 is an aberration diagram of the optical system according to the third embodiment.
Figure 7:
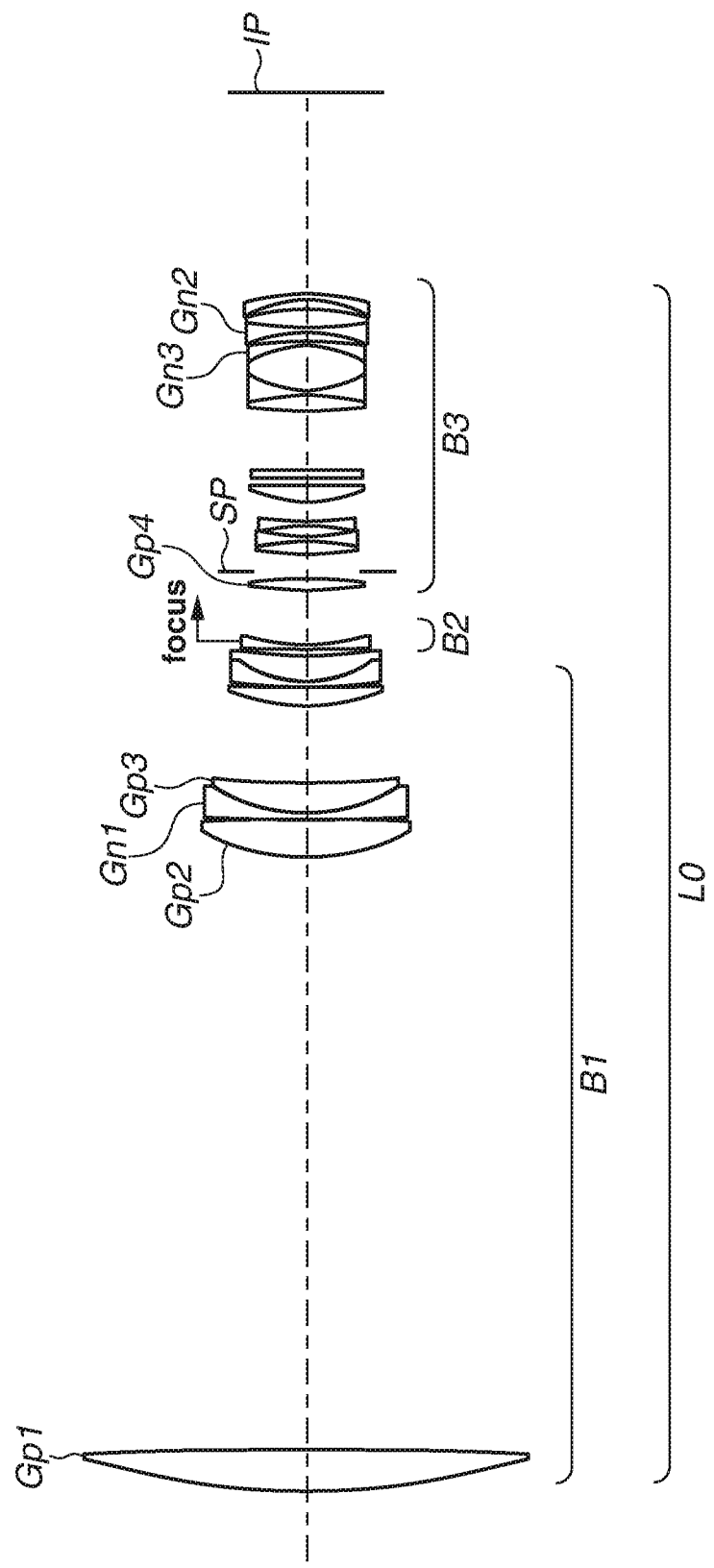
FIG. 7 is a cross-sectional view of an optical system according to a fourth embodiment.
Figure 8:
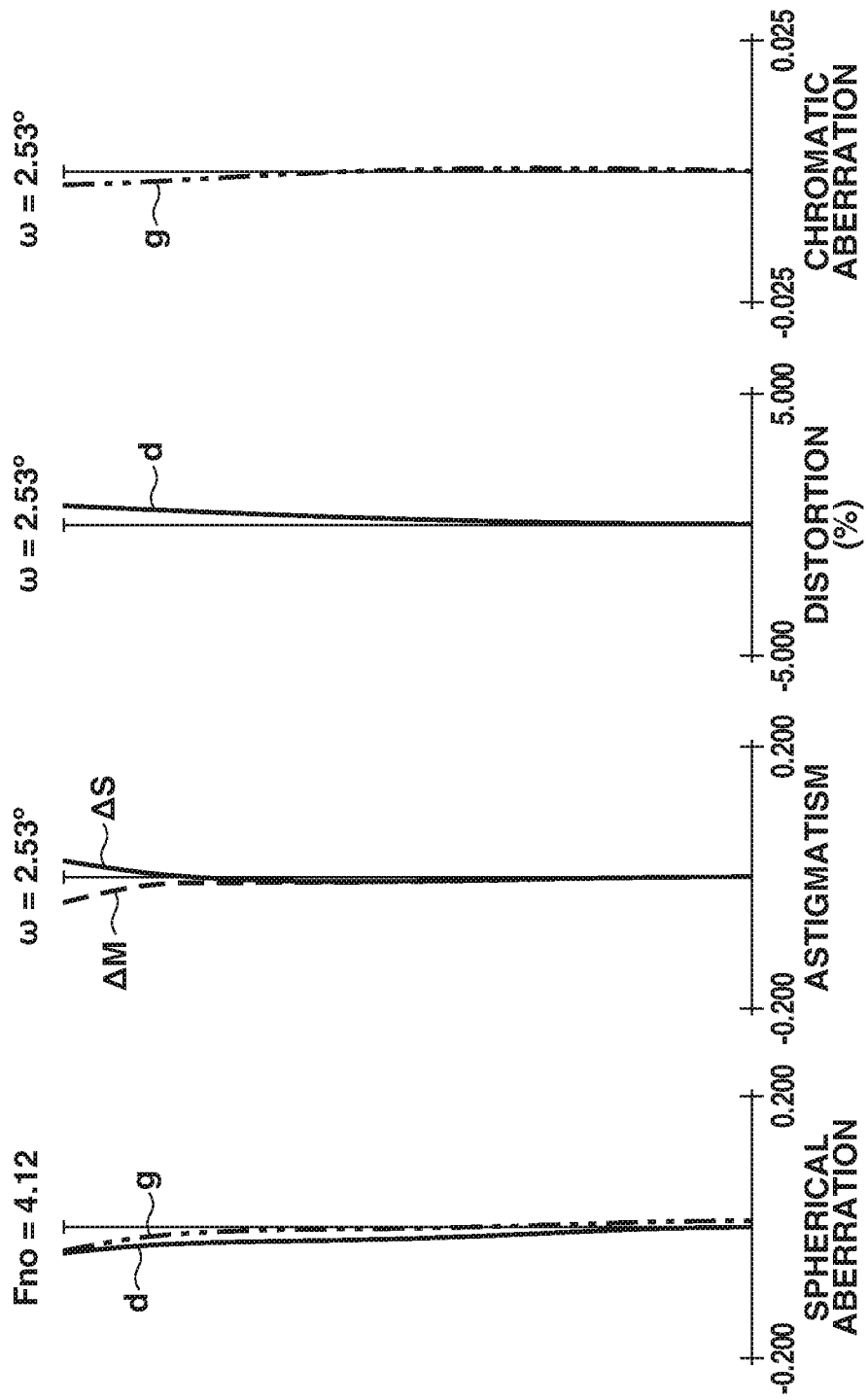
FIG. 8 is an aberration diagram of the optical system according to the fourth embodiment.
Figure 9:
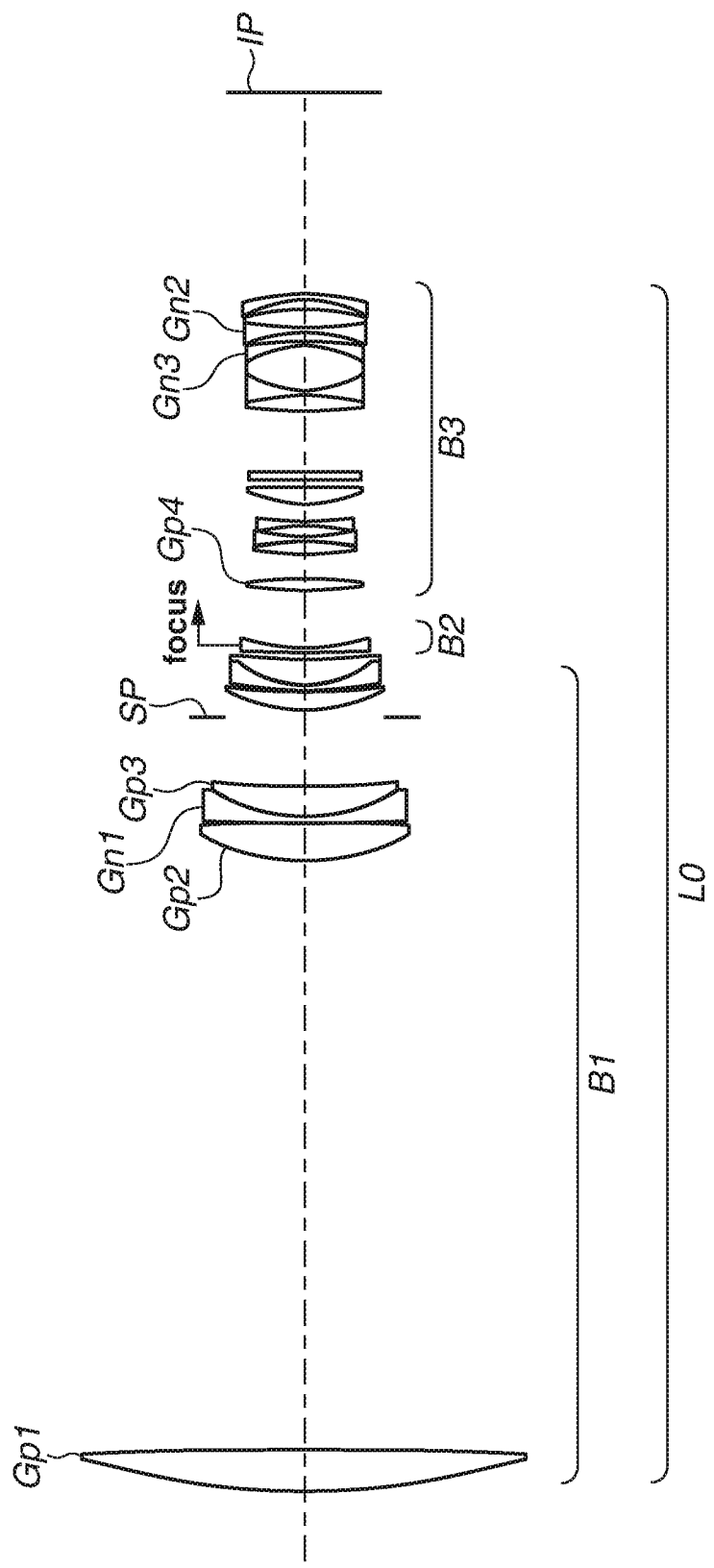
FIG. 9 is a cross-sectional view of an optical system according to a fifth embodiment.
Figure 10:
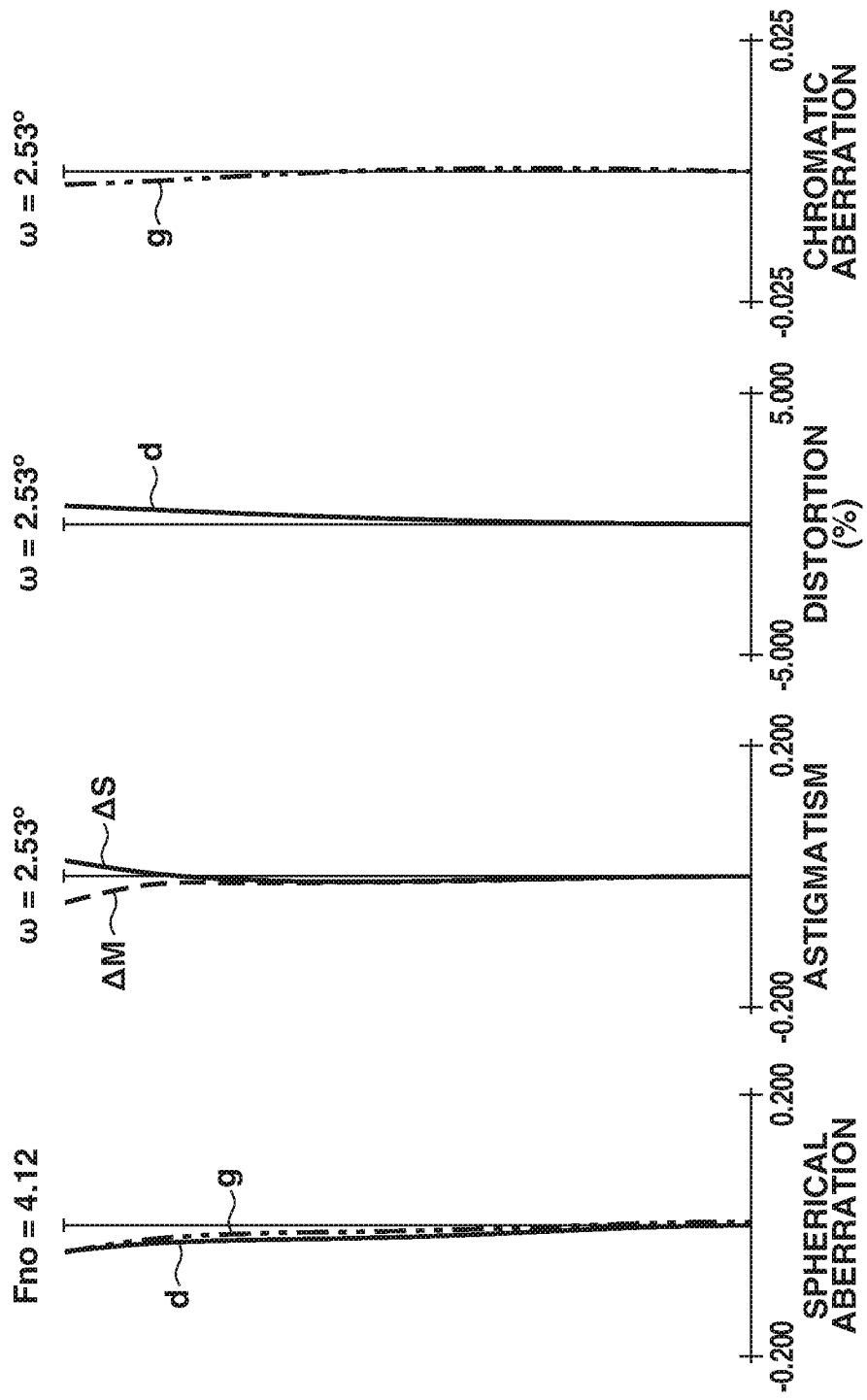
FIG. 10 is an aberration diagram of the optical system according to the fifth embodiment.
Figure 11:
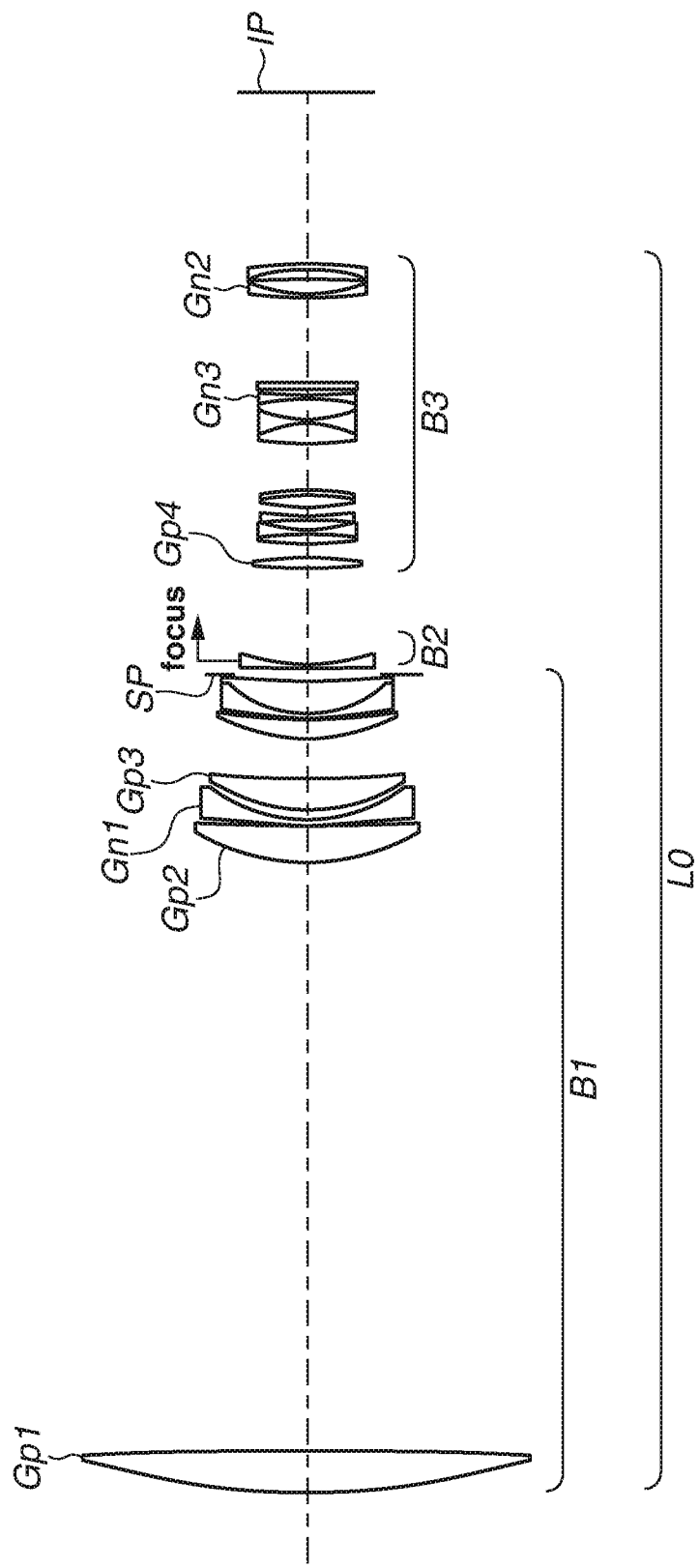
FIG. 11 is a cross-sectional view of an optical system according to a sixth embodiment.
Figure 12:
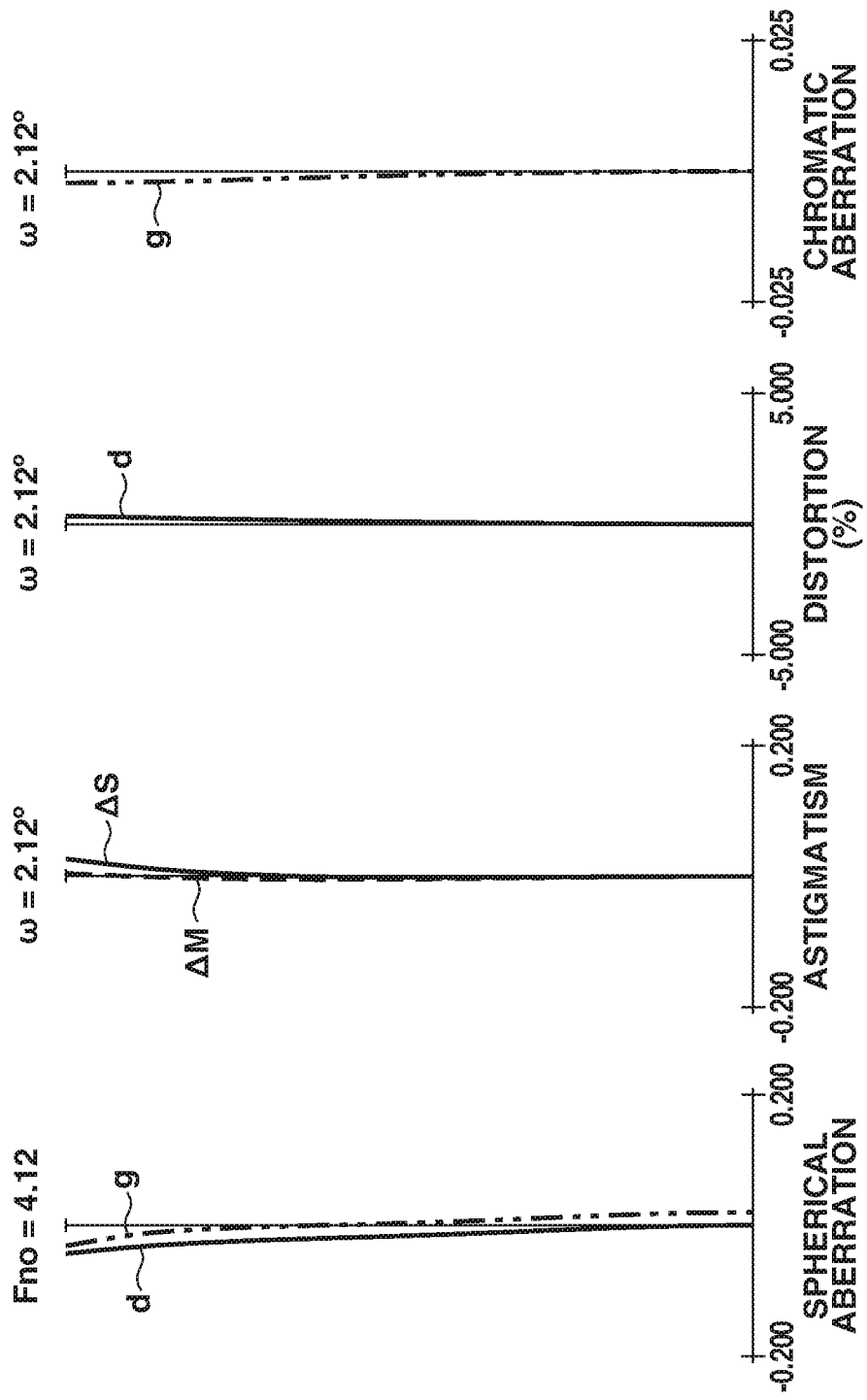
FIG. 12 is an aberration diagram of the optical system according to the sixth embodiment.
Figure 13:
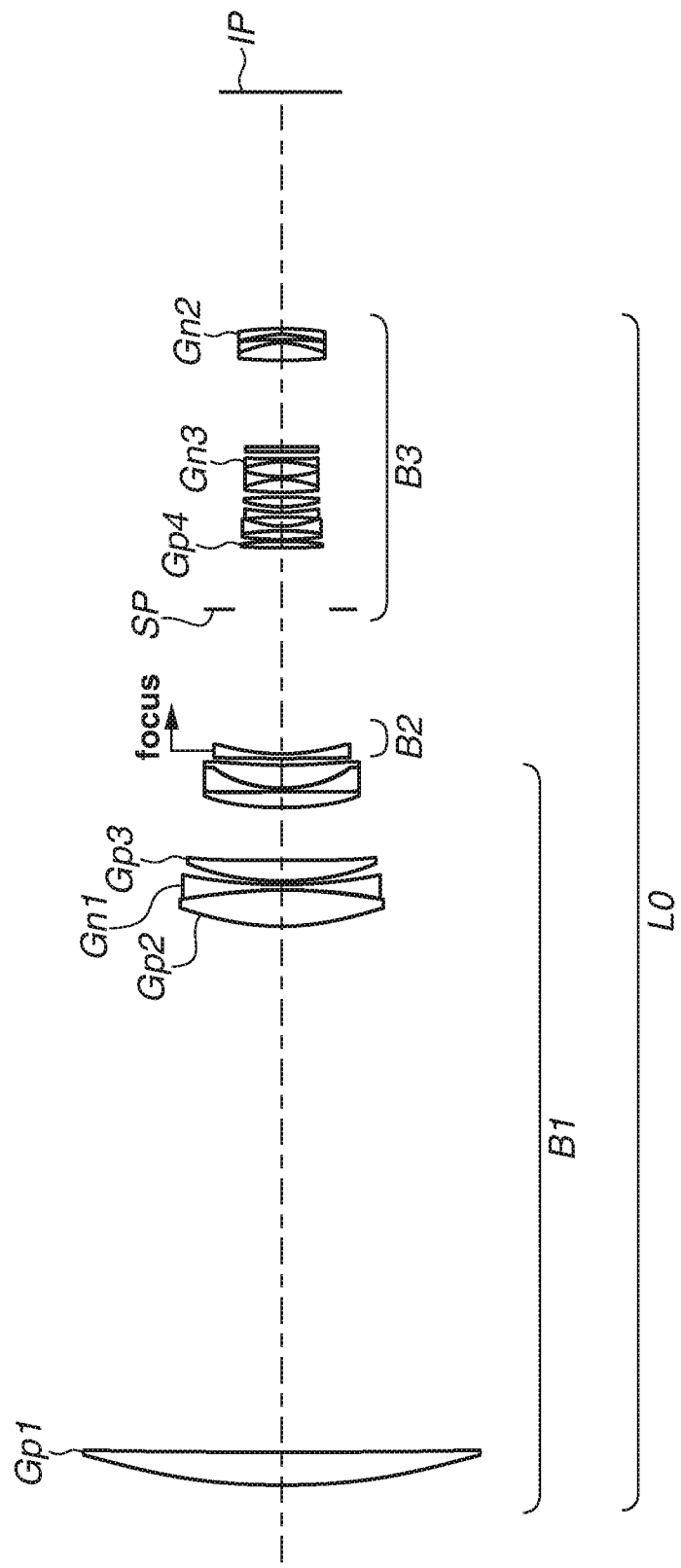
FIG. 13 is a cross-sectional view of an optical system according to a seventh embodiment.
Figure 14:
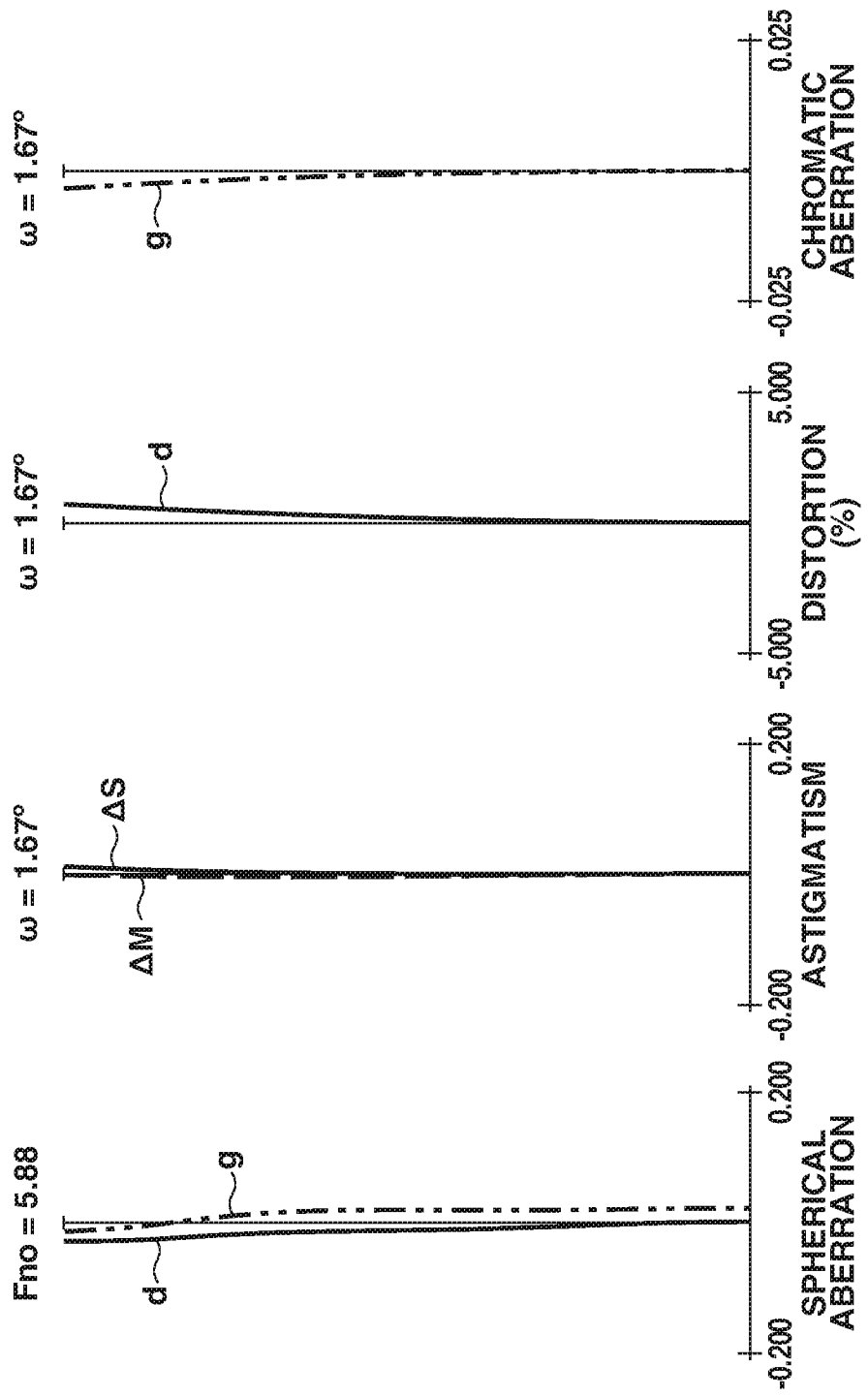
FIG. 14 is an aberration diagram of the optical system according to the seventh embodiment.
Figure 15:
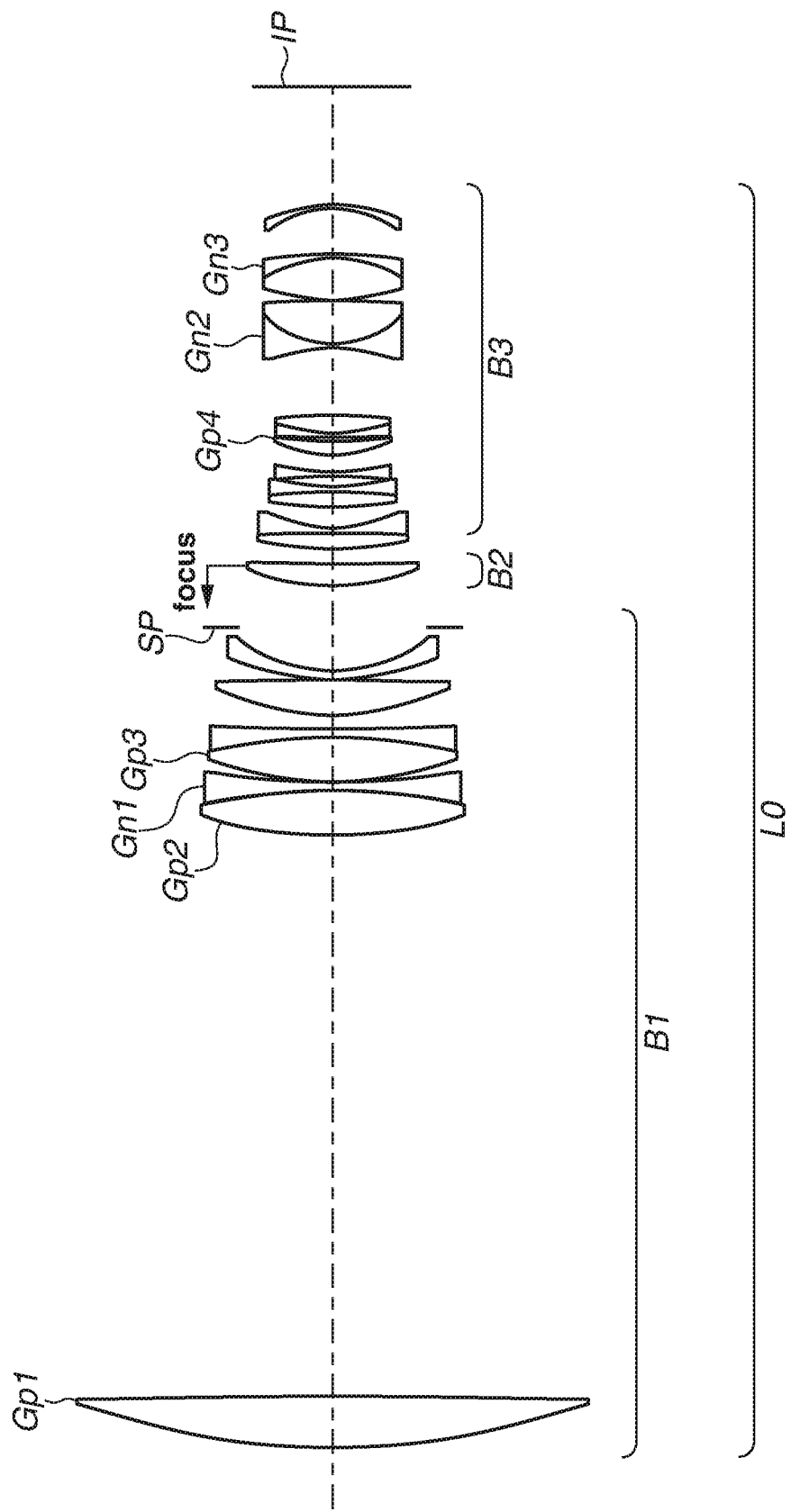
FIG. 15 is a cross-sectional view of an optical system according to an eighth embodiment.
Figure 16:
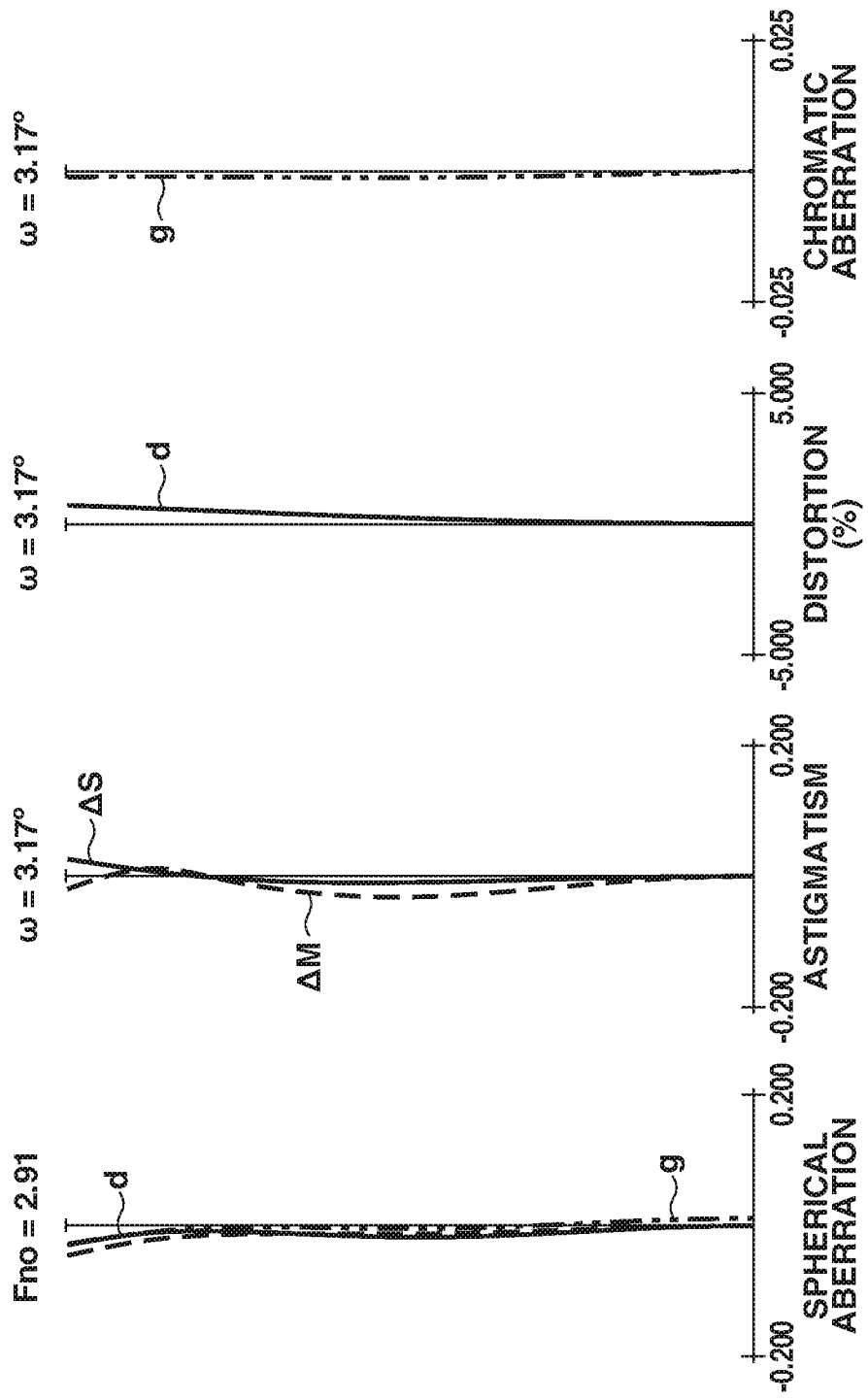
FIG. 16 is an aberration diagram of the optical system according to the eighth embodiment.

Hereinafter, an optical system according to an embodiment of the present invention and an imaging apparatus including the optical system will be described based on the attached drawings.

Embodiment of Optical System

An optical system according to each embodiment is an image pickup optical system used in an imaging apparatus such as a digital still camera, a broadcasting camera, a silver salt film camera, or a monitoring camera.

FIGS. 1, 3, 5, 7, 9, 11, 13, and 15 are cross-sectional views of respective optical systems L0 according to first to eighth embodiments in a state where focus is placed on an object at infinity. In each cross-sectional view, the left side corresponds to an object side (front side) and the right side corresponds to an image side (rear side). An aperture stop SP determines (restricts) a beam of an opened F-number (Fno). In focusing from an object at infinity to a closest-distance object, a focus lens unit moves in a direction indicated by an arrow in each diagram. When the optical system L0 is used as an image pickup optical system such as a digital still camera or a digital video camera, an image plane IP serves as an imaging plane of a solid-state image sensor (photoelectric conversion element) such as a charge-coupled device (CCD) sensor or a complementary metal-oxide semiconductor (CMOS) sensor. When the optical system L0 is used as an image pickup optical system of a silver-halide film camera, the image plane IP corresponds to a film surface.

FIGS. 2, 4, 6, 8, 10, 12, 14, and 16 are aberration diagrams of the respective optical systems L0 according to the first to eighth embodiments in a state where focus is placed on an object at infinity. In a spherical aberration diagram, "Fno" denotes an F-number, and spherical aberration amounts with respect to a d-line (wavelength: 587.56 nm) and a g-line (wavelength: 435.8 nm) are illustrated. In an astigmatism diagram, ΔS denotes an astigmatism amount on a sagittal image plane, and ΔM denotes an astigmatism amount on a meridional image plane. In a distortion aberration diagram, a distortion aberration amount with respect to a d-line is illustrated. In a chromatic aberration diagram, a distortion aberration amount with respect to a g-line is illustrated. In these diagrams, "ω" denotes an imaging half angle of view (°) obtained by paraxial calculation.

For obtaining the optical system L0 that is compact and lightweight, and has a high optical property, it becomes important to appropriately define the surface shape and the arrangement of a lens that is disposed relatively close to an object and tends to have a large diameter.

In view of the foregoing, the optical system L0 according to the present embodiment includes a positive lens (first positive lens) Gp1, and a negative lens (first negative lens) Gn1 disposed on an image side of the positive lens Gp1. The positive lens Gp1 is a positive lens disposed closest to an object among positive lenses included in the optical system L0. The negative lens Gn1 is a negative lens disposed closest to the object among negative lenses included in the optical system L0. By forming a telephoto-type optical system by disposing the negative lens Gn1 on the image side of the positive lens Gp1, it is possible to shorten the total lens length of the optical system L0, and correct various types of aberration generated in the positive lens Gp1, by the negative lens Gn1.

Furthermore, in the optical system L0 according to the present embodiment, at least one of an object side surface and an image side surface of the positive lens Gp1 is an aspherical surface. With this configuration, the generation of various types of aberration such as spherical aberration and comatic aberration that are generated in the positive lens Gp1 can be reduced. In particular, the positive lens Gp1 desirably has a shape having negative refractive power that gets stronger from a surface vertex toward the circumference (outer circumference of the positive lens Gp1). With this configuration, a reduction effect of spherical aberration and comatic aberration can be enhanced.

Furthermore, the optical system L0 according to the present embodiment satisfies the following conditional expressions (1) and (2).

$$0.20 < LD/f < 1.00 \tag{1}$$

$$0.382 < Dpn/LD < 0.800 \tag{2}$$

In the conditional expressions, "LD" is a total lens length of the optical system L0, "f" is a focal length of the optical system L0, and "Dpn" is a distance on an optical axis from an image side surface of the positive lens Gp1 to an object side surface of the negative lens Gn1.

Conditional Expression (1) defines a relationship between the focal length of the optical system L0 and the total lens length of the optical system L0. If the total lens length becomes so long that a value of LD/f exceeds an upper limit of Conditional Expression (1), the optical system L0 upsizes, which is undesirable. If the total lens length becomes so short that a value of LD/f falls below a lower limit of Conditional Expression (1), refractive power of each of the lenses included in the optical system L0 becomes stronger, and it becomes difficult to correct various types of aberration including magnification chromatic aberration, which is undesirable.

Conditional Expression (2) defines a relationship between the total lens length and an interval on the optical axis between the positive lens Gp1 and the negative lens Gn1. By widening an interval between the positive lens Gp1 and the negative lens (second negative lens) Gn2 so as to satisfy Conditional Expression (2), it is possible to reduce a beam diameter of an on-axis beam entering the negative lens Gn1, and reduce the diameter of the negative lens Gn1. By reducing the diameter of the negative lens Gn1 disposed relatively close to an object in the optical system L0, it is possible to save the weight of the negative lens Gn1, and save the weight of the optical system L0. If an interval between the positive lens Gp1 and the negative lens Gn1 becomes so wide that a value of Dpn/LD exceeds an upper limit of Conditional Expression (2), it becomes difficult to correct, by the negative lens Gn1, various types of aberration such as spherical aberration, comatic aberration, and magnification chromatic aberration that are generated in the positive lens Gp1, which is undesirable. If an interval between the positive lens Gp1 and the negative lens Gn1 becomes so narrow that a value of Dpn/LD falls below a lower limit of Conditional Expression (2), a beam diameter of an on-axis beam entering the negative lens Gn1 becomes larger. The diameter of the negative lens Gn1 accordingly becomes larger, and it becomes difficult to save the weight of the optical system L0, which is undesirable.

It is desirable that numerical value ranges of Conditional Expressions (1) and (2) are set to numerical value ranges of the following conditional expressions (1a) and (2a).

$$0.50 < LD/f < 0.98 \tag{1a}$$

$$0.391 < Dpn/LD < 0.600 \tag{2a}$$

Furthermore, it is desirable that numerical value ranges of Conditional Expressions (1) and (2) are set to numerical value ranges of the following conditional expressions (1b) and (2b).

$$0.60 < LD/f < 0.97 \tag{1b}$$

$$0.426 < Dpn/LD < 0.500 \tag{2b}$$

Next, a desirable configuration of the optical system L0 according to an embodiment will be described.

In a telephoto-type optical system, because a passing height of a peripheral ray of an on-axis beam passing through a lens disposed relatively close to an object becomes high, for satisfactorily correcting spherical aberration, the configuration of a lens disposed relatively close to an object is important. Thus, the optical system L0 according to an embodiment desirably includes one or more positive lenses or more desirably includes two or more positive lenses on the image side of the positive lens Gp1 and the object side of the aperture stop SP. By causing a plurality of positive lenses including the positive lens Gp1 to share positive refractive power, it is possible to increase a curvature radius of one positive lens as compared with a case where only one positive lens having strong refractive power is disposed.

With this configuration, it is possible to reduce the generation of various types of aberration including spherical aberration while keeping positive refractive power of the optical system L0 and achieving a shortening effect of the total lens length. Furthermore, the optical system L0 desirably includes the positive lens Gp1, a positive lens (second positive lens) Gp2, the negative lens Gn1, and a positive lens (third positive lens) Gp3 that are consecutively disposed in order from a lens closest to the object to the image side. With this configuration, it becomes easier to correct spherical aberration and comatic aberration in the optical system L0.

It is desirable the optical system L0 consists of a first lens unit B1 immovable in focusing, a second lens unit B2 moving in focusing, and a third lens unit B3 immovable in focusing, which are disposed in order from the object side to the image side. The first lens unit B1 has positive refractive power, and the second lens unit B2 and the third lens unit B3 each have positive or negative refractive power. By converging a beam having passed through the first lens unit B1, by the positive refractive power of the first lens unit B1, it is possible to reduce a beam diameter of a beam passing through the second lens unit B2. It is therefore possible to reduce the diameter of the second lens unit B2. It is accordingly possible to save the weight of the second lens unit B2 being a lens unit moving in focusing, and simplify a mechanism of an actuator for driving the second lens unit B2. Furthermore, it is desirable that the second lens unit B2 consists of three or less lenses. With this configuration, it is possible to further save the weight of the second lens unit B2 and save the weight of the optical system L0.

It is desirable that the third lens unit B3 includes a positive lens (fourth positive lens) Gp4 disposed on the image side of a third positive lens counted from the object side among positive lenses included in the optical system L0, and one or more negative lenses disposed on the image side of the positive lens Gp4. By disposing a positive lens and a negative lens in order from the object side to the image side, in a portion in the optical system L0 that is relatively close to an image, refractive power arrangement of a partial system of the optical system L0 can also be made telephoto type. With this configuration, it becomes further easier to shorten the total lens length, and a downsizing effect of the optical system L0 improves. It is especially desirable that a plurality of negative lenses (negative lens Gn2 and negative lens (third negative lens) Gn3) are disposed on the image side of the positive lens Gp4. In a telephoto-type optical system, because a passing height of a principal ray of an off-axis beam passing through a lens disposed on the image side tends to be high, for satisfactorily correcting distortion aberration, the configuration of a lens disposed relatively close to an image in the optical system L0 becomes important. By disposing a plurality of negative lenses on the image side of the positive lens Gp4 and causing the plurality of negative lenses to share negative refractive power, it is possible to increase a curvature radius of one negative lens as compared with a case where only one negative lens having refractive power is disposed. With this configuration, it is possible to reduce the generation of various types of aberration including distortion aberration, while keeping negative refractive power necessary for downsizing of the optical system L0.

Furthermore, the optical system L0 according to an embodiment desirably satisfies at least one or more of the following conditional expressions (3) to (22).

$$1.493 < Ndp1 < 1.700 \quad (3)$$

$$55.0 < vdp1 < 96.0 \quad (4)$$

$$1.400 < Ndp2 < 1.630 \quad (5)$$

$$61.0 < vdp2 < 96.0 \quad (6)$$

$$1.400 < Ndp3 < 1.630 \quad (7)$$

$$61.0 < vdp3 < 96.0 \quad (8)$$

$$1.400 < Ndp4 < 1.630 \quad (9)$$

$$50.0 < vdp4 < 96.0 \quad (10)$$

$$1.600 < Ndn1 < 1.950 \quad (11)$$

$$20.0 < vdn1 < 50.0 \quad (12)$$

$$1.400 < Ndn2 < 1.630 \quad (13)$$

$$61.0 < vdn2 < 96.0 \quad (14)$$

$$1.800 < Ndn3 < 2.200 \quad (15)$$

$$14.0 < vdn3 < 24.0 \quad (16)$$

$$0.10 < f1/f < 1.20 \quad (17)$$

$$0.00001 < DRGp1 \times Fno/f < 0.00500 \quad (18)$$

$$0.10 < (rp2+rp1)/(rp2-rp1) < 2.00 \quad (19)$$

$$0.20 < f11/f < 2.00 \quad (20)$$

$$0.20 < d12/f11 < 0.60 \quad (21)$$

$$20 < YASPH < 200 \quad (22)$$

In these conditional expressions, "Ndp1" is a refractive index with respect to a d-line of material of the positive lens Gp1, and "vdp1" is an Abbe number that is based on the d-line of the material of the positive lens Gp1.

In the present specification, an Abbe number vd that is based on a d-line of certain material is represented as $$vd=(Nd-1)/(NF-NC),$$

where refractive indices on a d-line (587.6 nm), an F-line (486.1 nm), a C-line (656.3 nm), and a g-line (wavelength: 435.8 nm) of a Fraunhofer line are respectively denoted by Nd, NF, and NC.

In a case where the optical system L0 includes two or more positive lenses, "Ndp1" is a refractive index with respect to the d-line of material of the positive lens Gp2 disposed second from the object side among positive lenses included in the optical system L0, and "vdp2" is an Abbe number that is based on the d-line of the material of the positive lens Gp2. In a case where the optical system L0 includes three or more positive lenses, "Ndp3" is a refractive index with respect to the d-line of material of the positive lens Gp3 disposed third from the object side among positive lenses included in the optical system L0, and "vdp3" is an Abbe number that is based on the d-line of the material of the positive lens Gp3. In a case where the optical system L0 includes four or more positive lenses, a positive lens disposed on the image side of the positive lens Gp3 disposed third from the object side among positive lenses included in the optical system L0 is the positive lens Gp4. At this time, "Ndp4" is a refractive index with respect to the d-line of material of the positive lens Gp4, and "vdp4" is an Abbe number that is based on the d-line of the material of the positive lens Gp4.

"Ndn1" is a refractive index with respect to the d-line of material of the negative lens Gn1, and "vdn1" is an Abbe number that is based on the d-line of the material of the negative lens Gn1.

In a case where the optical system L0 consists of the first lens unit B1, the second lens unit B2, and the third lens unit B3 that are disposed in order from the object side to the image side, the third lens unit B3 includes the negative lens Gn2. At this time, "Ndn2" is a refractive index with respect to the d-line of material of the negative lens Gn2, and "vdn2" is an Abbe number that is based on the d-line of the material of the negative lens Gn2. In a case where the third lens unit B3 includes the negative lens Gn3, "Ndn3" is a refractive index with respect to the d-line of material of the negative lens Gn3, and "vdn3" is an Abbe number that is based on the d-line of the material of the negative lens Gn3.

"f1" is a focal length of the first lens unit B1 that is obtainable when the optical system L0 consists of the first lens unit B1, the second lens unit B2, and the third lens unit B3 that are disposed in order from the object side to the image side. "f" is a focal length of the optical system L0. "DRGp1" is an aspherical surface amount at a 70%-position of an effective diameter of an aspherical surface of the positive lens Gp1, and "Fno" is an F-number of the optical system L0.

The effective diameter of a lens refers to a diameter of a circle having a radius corresponding to the height from an optical axis of a ray passing through a position farthest from the optical axis among rays passing through the lens surface.

Figure 18:
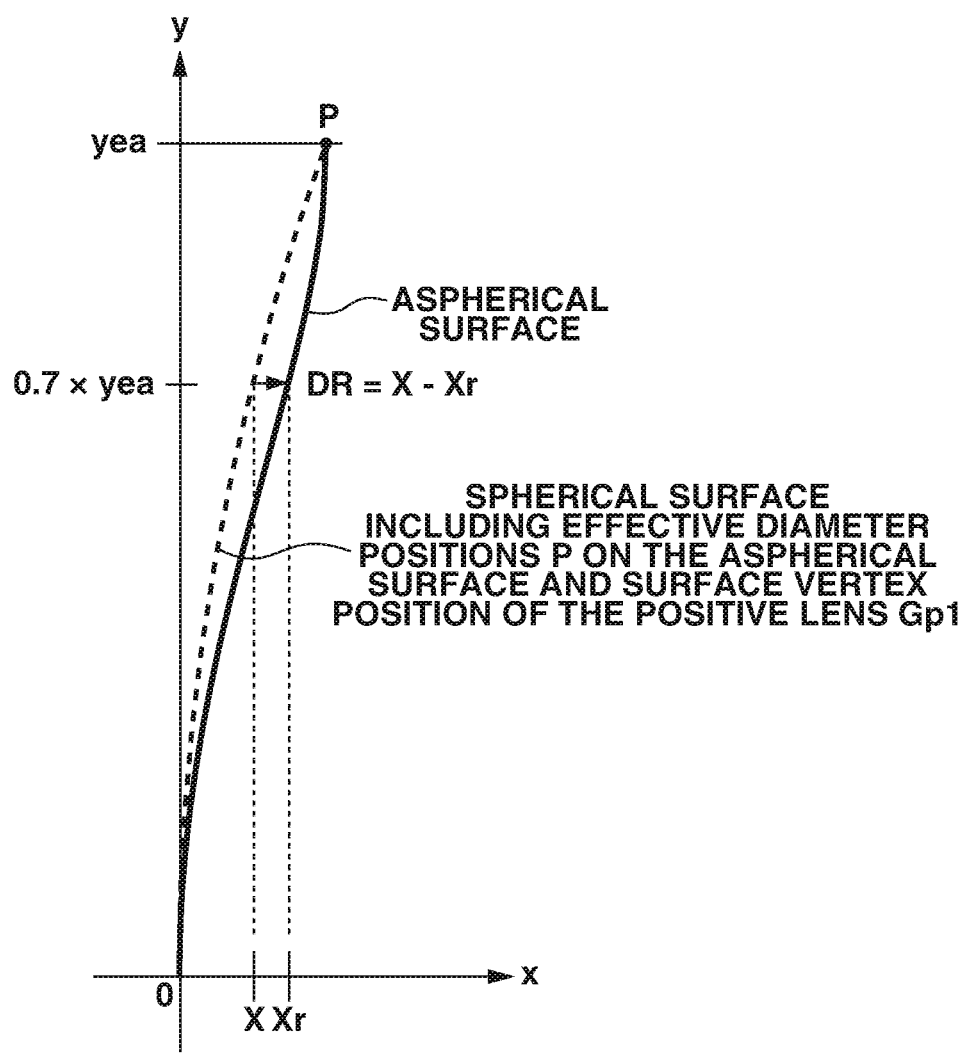
FIG. 18 is an explanatory diagram of a calculation method of a conditional expression for an aspherical shape.

Next, an aspherical surface amount at a 70%-position of the effective diameter of the positive lens Gp1 will be described with reference to FIG. 18. The 70%-position of the effective diameter of the positive lens Gp1 refers to a position advanced seven out of ten up to a position for determining an effective diameter, when viewed from a position (surface vertex) on the optical axis on the positive lens Gp1. An effective diameter ΦGp1 of the positive lens Gp1 is represented as ΦGp1=f/Fno where "Fno" represents an F-number of the optical system L0 in a state where a focus is placed on an object at infinity. A height yea from the optical axis at a position P for determining an effective diameter on an aspherical surface is y=ΦGp1/2, and the 70%-position of the effective diameter of the positive lens Gp1 is represented as y=0.7×yea. The aspherical surface amount is a difference in position in an optical axis direction between an arbitrary position on a spherical surface (reference spherical surface) including the effective diameter position P on an aspherical surface and a surface vertex of the positive lens Gp1, and a position on the aspherical surface at the same height as the arbitrary position. Accordingly, an aspherical surface amount at the 70%-position of the effective diameter is represented as DR=X−Xr in FIG. 18.

"rp1" is a curvature radius of an object side surface of the positive lens Gp1, and "rp2" is a curvature radius of an image side surface of the positive lens Gp1. In the case of an aspherical surface, a curvature radius of an approximate spherical surface that is obtained when the neighborhood of an axis is approximated as a spherical surface is regarded as a curvature radius of the surface. "f11" is a focal length of the positive lens Gp1.

In a case where the optical system L0 includes two or more positive lenses, a second positive lens from the object side among positive lenses included in the optical system L0 is the positive lens Gp2, and d12 is a distance on the optical axis from an image side surface of the positive lens Gp1 to an object side surface of the positive lens Gp2.

"YASPH (mm)" is a maximum height of an incident point on the aspherical surface of an on-axis ray in a state where a focus is placed on an object at infinity. The height refers to a distance from the optical axis in a vertical direction to the optical axis (diameter direction).

Conditional Expression (3) defines a refractive index of the material of the positive lens Gp1. By using material having a moderately-high refractive index, both of downsizing and weight saving of the optical system L0 are achieved. In general optical material, a specific weight tends to become larger as a refractive index becomes higher. Thus, if a refractive index of the material of the positive lens Gp1 becomes so high as to exceed an upper limit of Conditional Expression (3), a specific weight of the positive lens Gp1 having a larger diameter in the optical system L0 becomes larger, and it becomes difficult to save the weight of the optical system L0, which is undesirable. If a refractive index of the material of the positive lens Gp1 becomes so low as to fall below a lower limit of Conditional Expression (3), positive refractive power of the positive lens Gp1 becomes weaker, and it becomes difficult to downsize the optical system L0, which is undesirable.

Conditional Expression (4) defines an Abbe number of the material of the positive lens Gp1. By appropriately setting an Abbe number, both of high optical performance and weight saving are achieved.

In general optical material, a specific weight tends to become larger as an Abbe number of the material becomes larger. Thus, if an Abbe number of the material of the positive lens Gp1 becomes so large as to exceed an upper limit of Conditional Expression (4), a specific weight of the positive lens Gp1 becomes larger, and it becomes difficult to save the weight of the optical system L0, which is undesirable. If an Abbe number of the material of the positive lens Gp1 becomes so small as to fall below a lower limit of Conditional Expression (4), it becomes difficult to correct chromatic aberration such as magnification chromatic aberration generated in the positive lens Gp1, which is undesirable.

Conditional Expression (5) defines a refractive index of the material of the positive lens Gp2. By using material having a moderately-high refractive index, both of downsizing and weight saving of the optical system L0 are achieved.

If a refractive index of the material of the positive lens Gp2 becomes so high as to exceed an upper limit of Conditional Expression (5), a specific weight of the positive lens Gp2 becomes larger, and it becomes difficult to save the weight of the optical system L0, which is undesirable. If a refractive index of the material of the positive lens Gp2 becomes so low as to fall below a lower limit of Conditional Expression (5), refractive power of the positive lens Gp2 becomes weaker, the total lens length becomes longer, and it becomes difficult to downsize the optical system L0, which is undesirable. Conditional Expression (6) defines an Abbe number of the material of the positive lens Gp2. By appropriately setting an Abbe number, both of high optical performance and weight saving are achieved. If an Abbe number of the material of the positive lens Gp2 becomes so large as to exceed an upper limit of Conditional Expression (6), a specific weight of the positive lens Gp2 becomes larger, and it becomes difficult to save the weight of the optical system L0, which is undesirable. If an Abbe number of the material of the positive lens Gp2 becomes so small as to fall below a lower limit of Conditional Expression (6), chromatic aberration such as magnification chromatic aberration generated in the positive lens Gp2 becomes larger, which is undesirable.

Conditional Expression (7) defines a refractive index of the material of the positive lens Gp3. By using material having a moderately-high refractive index, both of downsizing and weight saving of the optical system L0 are achieved. If a refractive index of the material of the positive lens Gp3 becomes so high as to exceed an upper limit of Conditional Expression (7), a specific weight of the positive lens Gp3 becomes larger, and it becomes difficult to save the weight of the optical system L0, which is undesirable. If a refractive index of the material of the positive lens Gp3 becomes so low as to fall below a lower limit of Conditional Expression (7), refractive power of the positive lens Gp3 becomes weaker, the total lens length becomes longer, and it becomes difficult to downsize the optical system L0, which is undesirable.

Conditional Expression (8) defines an Abbe number of the material of the positive lens Gp3. By appropriately setting an Abbe number, both of high optical performance and weight saving are achieved.

If an Abbe number of the material of the positive lens Gp3 becomes so large as to exceed an upper limit of Conditional Expression (8), a specific weight of the positive lens Gp3 becomes larger, and it becomes difficult to save the weight of the optical system L0, which is undesirable. If an Abbe number of the material of the positive lens Gp3 becomes so small as to fall below a lower limit of the material of Conditional Expression (8), chromatic aberration such as magnification chromatic aberration generated in the positive lens Gp3 becomes larger, which is undesirable.

Conditional Expression (9) defines a refractive index of the material of the positive lens Gp4. By using material having a moderately-high refractive index, both of downsizing and weight saving of the optical system L0 are achieved. If a refractive index of the material of the positive lens Gp4 becomes so high as to exceed an upper limit of Conditional Expression (9), a specific weight of the positive lens Gp4 becomes larger, and it becomes difficult to save the weight of the optical system L0, which is undesirable. If a refractive index of the material of the positive lens Gp4 becomes so low as to fall below a lower limit of Conditional Expression (9), refractive power of the positive lens Gp4 is weaker, and it becomes difficult to downsize the optical system L0, which is undesirable.

Conditional Expression (10) defines an Abbe number of the material of the positive lens Gp4. By appropriately setting an Abbe number, both of high optical performance and weight saving are achieved. If an Abbe number of the material of the positive lens Gp4 becomes so large as to exceed an upper limit of Conditional Expression (10), a specific weight of the positive lens Gp4 becomes larger, and it becomes difficult to save the weight of the optical system L0, which is undesirable. If an Abbe number of the material of the positive lens Gp4 becomes so small as to fall below a lower limit of Conditional Expression (10), it becomes difficult to correct chromatic aberration such as magnification chromatic aberration generated in the positive lens Gp4, which is undesirable.

Conditional Expression (11) defines a refractive index of the material of the negative lens Gn1. By controlling a refractive index of the material of the negative lens Gn1, all of downsizing, weight saving, and high image quality of the optical system L0 are achieved. In the telephoto-type optical system L0, by disposing a lens having negative refractive power at a position relatively close to an image in the optical system L0, the total lens length is shortened. Nevertheless, by strengthening the negative refractive power, a Petzval sum tends to become larger toward a minus side, and image plane curve tends to become larger toward a minus side. Accordingly, by forming the negative lens Gn1 using material having a relatively-high refractive index, it becomes easier to achieve satisfactory optical performance while shortening the total lens length. On the other hand, in general optical material, if a refractive index is high, a specific weight tends to become larger. Thus, if a refractive index of the negative lens Gn1 is made too high, it becomes difficult to save the weight of the optical system L0. If a refractive index of the material of the negative lens Gn1 becomes so high as to exceed an upper limit of Conditional Expression (11), a specific weight of the negative lens Gn1 becomes larger, and it becomes difficult to save the weight of the optical system L0, which is undesirable. If a refractive index of the material of the negative lens Gn1 becomes so low as to fall below a lower limit of Conditional Expression (11), a Petzval sum becomes larger toward a minus side, and generated image plane curve becomes larger toward a minus side. It therefore becomes difficult to achieve high image quality, which is undesirable.

Conditional Expression (12) defines an Abbe number of the material of the negative lens Gn1. By appropriately setting an Abbe number of the material of the negative lens Gn1, both of satisfactory correction of chromatic aberration and weight saving of the optical system L0 are achieved. In general optical material, if an Abbe number of the material is small, a value of a partial dispersion ratio $\theta gF$ tends to become larger. If an Abbe number of the material of the negative lens Gn1 becomes so large as to exceed an upper limit of Conditional Expression (12), a partial dispersion ratio $\theta gf$ of the negative lens Gn1 becomes too small. It therefore becomes difficult to correct second-order chromatic aberration, which is undesirable. If an Abbe number of the material of the negative lens Gn1 becomes so small as to fall below a lower limit of Conditional Expression (12), a correction effect of first-order chromatic aberration becomes insufficient, which is undesirable. For obtaining a correction effect of first-order chromatic aberration, it is necessary to strengthen refractive power of the negative lens Gn1. It therefore becomes difficult to achieve both of high performance and weight saving, which is undesirable.

A partial dispersion ratio $\theta gF$ is represented as $\theta gF=(Nd-Ng)/(NF-NC)$, where refractive indices on a d-line (587.6 nm), an F-line (486.1 nm), a C-line (656.3 nm), a C-line (656.3 nm), and a g-line (wavelength: 435.8 nm) of a Fraunhofer line are respectively denoted by Nd, NF, NC, and Ng.

Conditional Expression (13) defines a refractive index of the material of the negative lens Gn2. If a refractive index of the material of the negative lens Gn2 becomes so high as to exceed an upper limit of Conditional Expression (13), a specific weight of the negative lens Gn2 becomes larger, and it becomes difficult to save the weight of the optical system L0, which is undesirable. If a refractive index of the material of the negative lens Gn2 becomes so low as to fall below a lower limit of Conditional Expression (13), a Petzval sum becomes larger toward a minus side, and generated image plane curve becomes larger toward a minus side, which is undesirable.

Conditional Expression (14) defines an Abbe number of the material of the negative lens Gn2.

If an Abbe number of the material of the negative lens Gn2 becomes so large as to exceed an upper limit of Conditional Expression (14), it becomes difficult to save the weight, which is undesirable. In a telephoto-type optical system, a lens configuration disposed on the image side has negative refractive power as a whole. Accordingly, by increasing an Abbe number of a negative lens disposed on the image side, it becomes easier to reduce the generation of magnification chromatic aberration. If an Abbe number of the material of the negative lens Gn2 becomes so small as to fall below a lower limit of Conditional Expression (14), it becomes difficult to correct magnification chromatic aberration, which is undesirable. Furthermore, negative refractive power of the negative lens Gn2 may be dispersed by disposing a plurality of negative lenses satisfying Conditional Expressions (13) and (14). It thereby becomes easier to correct distortion aberration.

Conditional Expression (15) defines a refractive index of the material of the negative lens Gn3. By appropriately setting a refractive index of the material of the negative lens Gn3, weight saving of the optical system L0 and the reduction of image plane curve are achieved. If a refractive index of the material of the negative lens Gn3 becomes so high as to exceed an upper limit of Conditional Expression (15), a specific weight of the negative lens Gn3 becomes larger, and it becomes difficult to save the weight of the optical system L0, which is undesirable. If a refractive index of the material of the negative lens Gn3 becomes so low as to fall below a lower limit of Conditional Expression (15), a Petzval sum becomes larger toward a minus side, and generated image plane curve becomes larger toward a minus side, which is undesirable.

Conditional Expression (16) defines an Abbe number of the material of the negative lens Gn3. By satisfying Conditional Expression (16), both of weight saving of the optical system L0 and correction of magnification chromatic aberration are achieved. For correcting magnification chromatic aberration, it is desirable to increase a partial dispersion ratio θgF of a negative lens disposed at a position relatively close to an image, at which a passing height of a principal ray of an off-axis beam becomes high. If an Abbe number of the material of the negative lens Gn3 becomes so large as to exceed an upper limit of Conditional Expression (16), the partial dispersion ratio θgF becomes too small. It accordingly becomes difficult to correct second-order chromatic aberration, which is undesirable. If an Abbe number of the material of the negative lens Gn3 becomes so small as to fall below a lower limit of Conditional Expression (16), it becomes difficult to correct first-order chromatic aberration, which is undesirable. For correcting the first-order chromatic aberration, the number of lenses included in the optical system L0 is increased, and it becomes difficult to save the weight of the optical system L0, which is undesirable.

Conditional Expression (17) defines a ratio between a focal length of the positive lens Gp1 and a focal length of the optical system L0. By satisfying Conditional Expression (17), both of downsizing and high optical performance of the optical system L0 are achieved. If a focal length of the positive lens Gp1 becomes so long that the ratio exceeds an upper limit of Conditional Expression (17), it becomes difficult to employ the telephoto-type refractive power arrangement. It accordingly becomes difficult to downsize the optical system L0, which is undesirable. If a focal length of the positive lens Gp1 becomes so short that the ratio falls below a lower limit of Conditional Expression (17), and refractive power of the positive lens Gp1 becomes stronger, it becomes difficult to correct magnification chromatic aberration and on-axis chromatic aberration, which is undesirable.

Conditional Expression (18) defines an aspherical surface amount of the positive lens Gp1. If an aspherical surface amount becomes so large as to exceed an upper limit of Conditional Expression (18), it becomes difficult to process the positive lens Gp1 and the manufacturing becomes difficult, which is undesirable. If an aspherical surface amount becomes so small as to fall below a lower limit of Conditional Expression (18), it becomes difficult to correct spherical aberration and comatic aberration, which is undesirable.

Conditional Expression (19) defines a shape factor (shape) of the positive lens Gp1. If a shape factor becomes larger, a strong meniscus shape is obtained, which is disadvantageous for weight saving while being advantageous for aberration correction. If a value of a shape factor becomes so large as to exceed an upper limit of Conditional Expression (19), the shape of the positive lens Gp1 becomes a meniscus shape having large constriction. It accordingly becomes difficult to save the weight of the positive lens Gp1, which is undesirable. If a value of a shape factor becomes so small as to fall below a lower limit of Conditional Expression (19), the positive lens Gp1 becomes a lens with a biconvex shape having a large thickness in an optical axis direction. Thus, large spherical aberration and comatic aberration are generated, and it becomes difficult to correct these types of aberrations, which is undesirable.

Conditional Expression (20) defines a ratio between a focal length of the first lens unit B1 and a focal length of the optical system L0. If a focal length of the first lens unit B1 becomes so long that the ratio exceeds an upper limit of Conditional Expression (20), and refractive power of the first lens unit B1 becomes weaker, the total lens length of the optical system L0 becomes longer, and it becomes difficult to downsize the optical system L0, which is undesirable. If a focal length of the first lens unit B1 becomes so short that the ratio falls below a lower limit of Conditional Expression (20), and refractive power of the first lens unit B1 becomes stronger, it becomes difficult to correct various types of aberration, which is undesirable.

Conditional Expression (21) defines a relationship between a distance on an optical axis from the image side surface of the positive lens Gp1 to the positive lens Gp2, and the total lens length of the optical system L0. By satisfying Conditional Expression (21), both of downsizing and weight saving of the optical system L0 are achieved. If an interval between the positive lens Gp1 and the positive lens Gp2 becomes so wide that a value of d12/f11 exceeds an upper limit of Conditional Expression (21), the total lens length becomes longer, which is undesirable. If an interval between the positive lens Gp1 and the positive lens Gp2 becomes so narrow that a value of d12/f11 falls below a lower limit of Conditional Expression (21), the diameter of the positive lens Gp2 that has a relatively-large beam diameter and is disposed on the object side becomes larger. It accordingly becomes difficult to save the weight of the optical system L0, which is undesirable.

Conditional Expression (22) defines the maximum value of a height (ray height) of an incident point of an on-axis ray when passing through an aspherical surface of the positive lens Gp1 in a state where a focus is placed on an object at infinity. For sufficiently exhibiting an aberration correction effect caused by an aspherical surface, a ray height of an on-axis ray passing through the aspherical surface needs to be large to some extent. If the ray height becomes too small so as to fall below a lower limit, spherical aberration correction becomes insufficient, and it becomes difficult to achieve high image quality, which is undesirable. If the ray height becomes too large so as to exceed an upper limit, an effective diameter of the aspherical surface becomes larger, and it becomes difficult to achieve weight saving, which is undesirable.

It is more desirable that numerical value ranges of Conditional Expressions (3) to (22) are set to numerical value ranges of the following Conditional Expressions (3a) to (22a).

$$1.495 < Ndp1 < 1.650 \tag{3a}$$

$$60.00 < vdp1 < 82.0 \tag{4a}$$

$$1.420 < Ndp2 < 1.550 \tag{5a}$$

$$70.0 < vdp2 < 96.0 \tag{6a}$$

$$1.420 < Ndp3 < 1.550 \tag{7a}$$

$$70.0 < vdp3 < 96.0 \tag{8a}$$

$$1.420 < Ndp4 < 1.550 \tag{9a}$$

$$80.0 < vdp4 < 95.5 \tag{10a}$$

$$1.700 < Ndn1 < 1.900 \tag{11a}$$

$$22.0 < vdn1 < 32.0 \tag{12a}$$

$$1.420 < Ndn2 < 1.550 \tag{13a}$$

$$70.0 < vdn2 < 95.5 \tag{14a}$$

$$1.850 < Ndn3 < 2.100 \tag{15a}$$

$$16.0 < vdn3 < 21.0 \tag{16a}$$

$$0.20 < f1/f < 1.00 \tag{17a}$$

$$0.00010 < DRGp1 \times Fno/f < 0.00100 \tag{18a}$$

$$0.30 < (rp2+rp1)/(rp2-rp1) < 1.50 \tag{19a}$$

$$0.40 < f11/f < 1.20 \tag{20a}$$

$$0.30 < d12/f11 < 0.55 \tag{21a}$$

$$30 < YASPH < 100 \tag{22a}$$

In addition, it is further desirable that numerical value ranges of Conditional Expressions (3) to (22) are set to numerical value ranges of the following Conditional Expressions (3b) to (22b).

$$1.585 < Ndp1 < 1.620 \tag{3b}$$

$$62.0 < vdp1 < 70.0 \tag{4b}$$

$$1.430 < Ndp2 < 1.510 \tag{5b}$$

$$80.0 < vdp2 < 95.5 \tag{6b}$$

$$1.430 < Ndp3 < 1.510 \tag{7b}$$

$$80.0 < vdp3 < 95.5 \tag{8b}$$

$$1.430 < Ndp4 < 1.520 \tag{9b}$$

$$90.0 < vdp4 < 95.0 \tag{10b}$$

$$1.800 < Ndn1 < 1.860 \tag{11b}$$

$$24.0 < vdn1 < 26.0 \tag{12b}$$

$$1.430 < Ndn2 < 1.510 \tag{13b}$$

$$80.0 < vdn2 < 95.0 \tag{14b}$$

$$1.920 < Ndn3 < 2.050 \tag{15b}$$

$$17.0 < vdn3 < 19.0 \tag{16b}$$

$$0.30 < f1/f < 0.95 \tag{17b}$$

$$0.00020 < DRGp1 \times Fno/f < 0.00090 \tag{18b}$$

$$0.40 < (rp2+rp1)/(rp2-rp1) < 1.21 \tag{19b}$$

$$0.50 < f11/f < 0.90 \tag{20b}$$

$$0.40 < d12/f11 < 0.52 \tag{21b}$$

$$40 < YASPH < 80 \tag{22b}$$

Next, the optical system L0 according to each embodiment will be described in detail.

In the optical systems L0 according to the first to eight embodiments, the first lens unit B1 and the third lens unit B3 are immovable in focusing, and only the second lens unit B2 moves in focusing. In other words, the optical system L0 is an optical system in which an interval between adjacent lens units changes in focusing.

The optical system L0 according to the first embodiment consists of the first lens unit B1 having positive refractive power, the positive second lens unit B2, and the third lens unit B3 having negative refractive power, which are disposed in order from the object side to the image side. In the optical system L0 according to the first embodiment, the second lens unit B2 moves toward the object side in focusing from an object at infinity to a closest-distance object. An object side surface of the positive lens Gp1 disposed closest to an object in the optical system L0 is an aspherical surface.

The optical systems L0 according to the second to sixth embodiments consists of the first lens unit B1 having positive refractive power, the negative second lens unit B2, and the third lens unit B3 having positive refractive power, which are disposed in order from the object side to the image side. In the optical systems L0 according to the second to sixth embodiments, the second lens unit B2 moves toward the image side in focusing from an object at infinity to a closest-distance object. An object side surface of the positive lens Gp1 disposed closest to an object in the optical system L0 is an aspherical surface.

The optical system L0 according to the seventh embodiment consists of the first lens unit B1 having positive refractive power, the negative second lens unit B2, and the third lens unit B3 having negative refractive power, which are disposed in order from the object side to the image side. In the optical system L0 according to the seventh embodiment, the second lens unit B2 moves toward the image side in focusing from an object at infinity to a closest-distance object. An object side surface of the positive lens Gp1 disposed closest to an object in the optical system L0 is an aspherical surface.

The optical system L0 according to the eighth embodiment consists of the first lens unit B1 having positive refractive power, the positive second lens unit B2, and the third lens unit B3 having negative refractive power, which are disposed in order from the object side to the image side. In the optical system L0 according to the eighth embodiment, the second lens unit B2 moves toward the object side in focusing from an object at infinity to a closest-distance object. An image side surface of the positive lens Gp1 disposed closest to an object in the optical system L0 is an aspherical surface.

In the optical systems L0 according to the first to eighth embodiments, four lenses from the lens closest to an object are the positive lens Gp1, the positive lens Gp2, the negative lens Gn1, and the positive lens Gp3 that are consecutively disposed in order from the object side to the image side. With this configuration, a downsizing effect of the optical system L0 is obtained, and the generation of various types of aberration such as spherical aberration is reduced.

The third lens unit B3 includes the positive lens Gp4, and the negative lens Gn2 and the negative lens Gn3 that are disposed on the image side of the positive lens Gp4. In the optical systems L0 according to the first to third and eighth embodiments, the negative lens Gn2 is disposed on the object side of the negative lens Gn3. In the optical systems L0 according to the fourth to seventh embodiments, the negative lens Gn3 is disposed on the object side of the negative lens Gn2. With this configuration, a downsizing effect of the optical system L0 is obtained, and the generation of various types of aberration such as distortion aberration is reduced.

The aperture stop SP may be disposed on the object side of the second lens unit B2 or may be disposed on the image side of the second lens unit B2. If the aperture stop SP is disposed on the image side of the second lens unit B2 as in the optical systems L0 according to the first, fourth, and seventh embodiments, it becomes easier to reduce the diameter of the aperture stop SP, and it is possible to downsize a lens apparatus including the optical system L0. If the aperture stop SP is disposed on the object side of the second lens unit B2 as in the optical systems L0 according to the second, third, fifth, sixth, and eighth embodiments, it becomes easier to secure a peripheral light amount when the aperture stop SP is brought into a small stop state.

In the first, second, and fourth to seventh embodiments, the third lens unit B3 includes a flat plate both surfaces of which have an infinite curvature radius. This is provided for causing the total lens length to stay unchanged even in a case where a user inserts a filter such as a neutral density (ND) filter in place of the flat plate.

In the optical systems L0 according to the first to eighth embodiments, all surfaces having refractive power are refractive surfaces. It is possible to easily obtain optical performance equal to or higher than that in a case where a diffraction optical element or a reflection surface is used, with a lower manufacturing difficulty level as compared with a case where a diffraction optical element or a reflection surface is used.

In the optical systems L0 according to the first to eighth embodiments, image stabilization correction may be reduced by moving a part of the optical system L0 in a direction including a component of a vertical direction to the optical axis. In particular, by causing a part of a third lens unit having relatively-small diameter, to serve as a portion moved in image stabilization correction, an actuator for driving can be made compact and a lens apparatus including the optical system L0 can be downsized.

Hereinafter, Numerical Examples 1 to 8 respectively corresponding to the first to eighth embodiments are provided.

In surface data of each numerical example, "r" denotes a curvature radius of each optical surface, and "d (mm)" denotes an on-axis interval (distance on an optical axis) between an m-th surface and an (m+1)-th surface. At this time, "m" denotes a number of a surface counted from a light incident side. In addition, "nd" denotes a refractive index with respect to the d-line of each optical member, and "vd" denotes an Abbe number that is based on the d-line of an optical member. The definition of the Abbe number has been described above.

In each numerical example, all of "d", a focal length (mm), an F-number, and a half field angle (°) indicate values obtainable when a focus of the optical system L0 according to each embodiment is placed on an object at infinity. A back focus BF indicates an air conversion value of a distance from a final lens surface (surface closest to an image) of the optical system L0 to an image plane. The total lens length of the optical system L0 is a value obtained by adding the back focus to a distance from a first lens surface to the final lens surface.

In addition, in a case where an optical surface is an aspherical surface, an asterisk (*) is added to the right side of a surface number. An aspherical shape is represented by the following expression:

$$x=(h^2/R)/[1+\{1-(1+k)(h/R)^2\}^{1/2}]+A4\times h^4+A6\times h^6+A8\times h^8+A10\times h^{10}+A12\times h^{12},$$

where "X" denotes a displacement amount from a surface vertex in an optical axis direction, "h" denotes a height from an optical axis in a vertical direction to the optical axis, "R" denotes a paraxial curvature radius, "k" denotes a conic constant, and "A4", "A6", "A8", "A10", and "A12" denote aspherical surface coefficients of the respective orders. In each aspherical surface coefficient, "e±XX" means "×10$^{\pm xx}$".

Furthermore, values corresponding to Conditional Expressions (1) to (22) in Numerical Examples 1 to 8 are listed in Table 1.

Numerical Example 1
Unit: mm

Surface data

| Surface number | r | d | nd | vd |
|---|---|---|---|---|
| 1* | 280.819 | 13.31 | 1.59349 | 67.0 |
| 2 | −662.008 | 155.41 | | |
| 3 | 83.002 | 10.00 | 1.43387 | 95.1 |
| 4 | 2343.445 | 0.20 | | |
| 5 | 246.274 | 1.70 | 1.85478 | 24.8 |
| 6 | 51.565 | 1.83 | | |
| 7 | 52.263 | 11.35 | 1.43387 | 95.1 |
| 8 | 705.477 | 9.27 | | |
| 9 | 52.406 | 5.29 | 1.89286 | 20.4 |
| 10 | 105.791 | 0.30 | | |
| 11 | 76.403 | 1.50 | 1.65412 | 39.7 |
| 12 | 31.854 | 13.02 | 1.43875 | 94.7 |
| 13 | −2658.460 | 2.00 | | |

Numerical Example 1
Unit: mm

| | | | | |
|---|---|---|---|---|
| 14 | 668.114 | 1.20 | 1.83481 | 42.7 |
| 15 | 41.557 | 18.61 | | |
| 16 (stop) | ∞ | 2.10 | | |
| 17 | −336.337 | 2.76 | 1.43875 | 94.7 |
| 18 | −67.619 | 1.00 | | |
| 19 | 228.172 | 3.68 | 1.80518 | 25.5 |
| 20 | −75.220 | 1.30 | 1.69680 | 55.5 |
| 21 | 53.781 | 3.35 | | |
| 22 | −81.585 | 1.20 | 1.61800 | 63.4 |
| 23 | 118.400 | 3.46 | | |
| 24 | 87.428 | 2.72 | 1.84666 | 23.8 |
| 25 | −507.253 | 3.50 | | |
| 26 | ∞ | 2.00 | 1.51633 | 64.1 |
| 27 | ∞ | 15.47 | | |
| 28 | −362.217 | 6.49 | 1.66565 | 35.6 |
| 29 | −36.199 | 1.70 | 1.43875 | 94.7 |
| 30 | 63.962 | 6.24 | | |
| 31 | 92.212 | 10.06 | 1.66565 | 35.6 |
| 32 | −39.445 | 1.20 | 1.94595 | 18.0 |
| 33 | −263.530 | 0.20 | | |
| 34 | 53.267 | 2.86 | 1.72047 | 34.7 |
| 35 | 79.604 | 54.90 | | |
| Image plane | ∞ | | | |

Aspherical surface data

First surface

K = 0.00000e+000  A4 = −1.72042e−008  A6 = −1.87003e−013  A8 = 2.28183e−018
A10 = −8.44369e−023

| | |
|---|---|
| Focal length | 390.15 |
| F-number | 2.91 |
| Half angle of view (°) | 3.17 |
| Image height | 21.64 |
| Total lens length | 371.16 |
| BF | 54.90 |

Lens unit data

| Group | Start surface | Focal length |
|---|---|---|
| 1 | 1 | 321.47 |
| 2 | 9 | 91.31 |
| 3 | 14 | −127.61 |

Numerical Example 2
Unit: mm

Surface data

| Surface number | r | d | nd | vd |
|---|---|---|---|---|
| 1* | 188.273 | 11.23 | 1.59349 | 67.0 |
| 2 | −503.174 | 94.27 | | |
| 3 | 57.957 | 11.11 | 1.43387 | 95.1 |
| 4 | −689.601 | 0.20 | | |
| 5 | 260.836 | 1.70 | 1.85478 | 24.8 |
| 6 | 38.276 | 1.73 | | |
| 7 | 39.048 | 8.19 | 1.43387 | 95.1 |
| 8 | 135.287 | 7.88 | | |
| 9 | 46.526 | 5.01 | 1.89286 | 20.4 |
| 10 | 135.378 | 0.30 | | |
| 11 | 72.225 | 1.50 | 1.80420 | 46.5 |
| 12 | 30.248 | 7.75 | 1.43875 | 94.7 |
| 13 | 188.650 | 2.00 | | |
| 14 (stop) | ∞ | 1.94 | | |
| 15 | 2244.521 | 1.10 | 1.63854 | 55.4 |
| 16 | 36.994 | 11.20 | | |
| 17 | 115.338 | 3.47 | 1.43875 | 94.7 |
| 18 | −76.882 | 1.00 | | |
| 19 | 834.139 | 2.43 | 1.92286 | 20.9 |
| 20 | −87.993 | 1.30 | 1.56384 | 60.7 |

-continued

Numerical Example 2
Unit: mm

| | | | | |
|---|---|---|---|---|
| 21 | 39.072 | 3.03 | | |
| 22 | −73.039 | 1.20 | 1.72916 | 54.7 |
| 23 | 70.746 | 2.70 | | |
| 24 | 68.806 | 3.09 | 1.51742 | 52.4 |
| 25 | −259.482 | 10.02 | | |
| 26 | ∞ | 2.00 | 1.51633 | 64.1 |
| 27 | ∞ | 2.00 | | |
| 28 | 86.337 | 8.70 | 1.61340 | 44.3 |
| 29 | −41.712 | 1.70 | 1.43875 | 94.7 |
| 30 | 47.340 | 0.75 | | |
| 31 | 51.354 | 9.49 | 1.66565 | 35.6 |
| 32 | −54.505 | 1.20 | 1.94595 | 18.0 |
| 33 | −624.434 | 52.99 | | |
| Image plane | ∞ | | | |

Aspherical surface data

First surface

K = 0.00000e+000   A4 = −5.28832e−008   A6 = −1.45196e−012   A8 = 2.18686e−017
A10 = −7.31885e−021

| | |
|---|---|
| Focal length | 292.50 |
| F-number | 2.91 |
| Half angle of view (°) | 4.23 |
| Image height | 21.64 |
| Total lens length | 274.19 |
| BF | 52.99 |

Lens unit data

| Group | Start surface | Focal length |
|---|---|---|
| 1 | 1 | 121.78 |
| 2 | 15 | −58.92 |
| 3 | 17 | 233.37 |

Numerical Example 3
Unit: mm

Surface data

| Surface number | r | d | nd | vd |
|---|---|---|---|---|
| 1* | 204.916 | 17.53 | 1.49700 | 81.5 |
| 2 | −560.323 | 155.11 | | |
| 3 | 55.653 | 11.71 | 1.43387 | 95.1 |
| 4 | −906.488 | 0.30 | | |
| 5 | 603.672 | 1.80 | 1.85478 | 24.8 |
| 6 | 39.895 | 0.61 | | |
| 7 | 40.089 | 10.35 | 1.43387 | 95.1 |
| 8 | 274.117 | 7.48 | | |
| 9 | 46.770 | 7.05 | 1.89286 | 20.4 |
| 10 | 305.115 | 0.20 | | |
| 11 | 171.992 | 1.50 | 1.80400 | 46.5 |
| 12 | 30.980 | 8.16 | 1.43875 | 94.7 |
| 13 | 225.443 | 1.74 | | |
| 14 (stop) | ∞ | 1.00 | | |
| 15 | 966.501 | 1.30 | 1.74320 | 49.3 |
| 16 | 45.459 | 20.37 | | |
| 17 | 328.466 | 2.73 | 1.51742 | 52.4 |
| 18 | −94.698 | 2.00 | | |
| 19 | 129.182 | 4.24 | 1.80610 | 33.3 |
| 20 | −54.881 | 1.40 | 1.53775 | 74.7 |
| 21 | 42.446 | 4.86 | | |
| 22 | −58.304 | 1.40 | 1.76385 | 48.5 |
| 23 | 59.365 | 2.69 | | |
| 24 | 61.179 | 7.92 | 1.66565 | 35.6 |
| 25 | −39.245 | 1.70 | 1.43875 | 94.7 |
| 26 | 83.633 | 3.65 | | |
| 27 | 72.159 | 8.81 | 1.66565 | 35.6 |
| 28 | −40.604 | 1.80 | 1.94595 | 18.0 |
| 29 | −506.009 | 15.98 | | |

Numerical Example 3
Unit: mm

| | | | | |
|---|---|---|---|---|
| 30 | 83.596 | 3.31 | 1.85478 | 24.8 |
| 31 | 263.097 | 38.43 | | |
| Image plane | ∞ | | | |

Aspherical surface data

First surface

K = 0.00000e+000  A4 = −2.26814e−008  A6 = −5.40105e−013  A8 = 3.39277e−018
A10 = −9.95340e−022

| | |
|---|---|
| Focal length | 390.15 |
| F-number | 2.91 |
| Half angle of view (°) | 3.17 |
| Image height | 21.64 |
| Total lens length | 347.13 |
| BF | 38.43 |

Lens unit data

| Group | Start surface | Focal length |
|---|---|---|
| 1 | 1 | 167.04 |
| 2 | 15 | −64.22 |
| 3 | 17 | 199.83 |

Numerical Example 4
Unit: mm

Surface data

| Surface number | r | d | nd | vd |
|---|---|---|---|---|
| 1* | 219.655 | 10.73 | 1.61800 | 63.4 |
| 2 | −3012.869 | 163.50 | | |
| 3 | 59.914 | 10.02 | 1.43387 | 95.1 |
| 4 | 4865.272 | 0.20 | | |
| 5 | 589.841 | 1.80 | 1.85478 | 24.8 |
| 6 | 47.637 | 0.20 | | |
| 7 | 47.187 | 8.26 | 1.43387 | 95.1 |
| 8 | 298.427 | 21.03 | | |
| 9 | 46.798 | 5.01 | 1.89286 | 20.4 |
| 10 | 165.350 | 0.30 | | |
| 11 | 115.172 | 1.50 | 1.80420 | 46.5 |
| 12 | 30.444 | 6.97 | 1.43875 | 94.7 |
| 13 | 136.906 | 2.00 | | |
| 14 | 806.974 | 1.20 | 1.83481 | 42.7 |
| 15 | 57.417 | 15.24 | | |
| 16 | 150.735 | 3.00 | 1.43875 | 94.7 |
| 17 | −116.306 | 2.00 | | |
| 18 | ∞ | 4.80 | | |
| 19 | 111.695 | 3.63 | 1.80000 | 29.8 |
| 20 | −77.218 | 1.30 | 1.69680 | 55.5 |
| 21 | 46.019 | 2.84 | | |
| 22 | −83.070 | 1.20 | 1.72916 | 54.7 |
| 23 | 124.163 | 5.23 | | |
| 24 | 36.314 | 4.53 | 1.54814 | 45.8 |
| 25 | 604.977 | 2.18 | | |
| 26 | ∞ | 2.00 | 1.51633 | 64.1 |
| 27 | ∞ | 16.44 | | |
| 28 | 132.934 | 4.41 | 1.61340 | 44.3 |
| 29 | −64.251 | 1.20 | 1.59522 | 67.7 |
| 30 | 28.401 | 0.20 | | |
| 31 | 28.442 | 12.13 | 1.66565 | 35.6 |
| 32 | −31.162 | 1.20 | 1.94595 | 18.0 |
| 33 | −156.312 | 2.51 | | |
| 34 | −45.608 | 1.40 | 1.43875 | 94.7 |
| 35 | 98.837 | 4.97 | 1.66565 | 35.6 |

-continued

Numerical Example 4
Unit: mm

| | | | | |
|---|---|---|---|---|
| 36 | −71.558 | 2.68 | | |
| 37 | −32.000 | 1.60 | 1.49700 | 81.6 |
| 38 | −61.495 | 55.61 | | |
| Image plane | ∞ | | | |

Aspherical surface data

First surface

K = 0.00000e+000  A4 = −8.02700e−009  A6 = −1.86355e−013  A8 = 2.89947e−018
A10 = −7.42167e−022

| | |
|---|---|
| Focal length | 489.84 |
| F-number | 4.12 |
| Half angle of view (°) | 2.53 |
| Image height | 21.64 |
| Total lens length | 385.02 |
| BF | 55.61 |

Lens unit data

| Group | Start surface | Focal length |
|---|---|---|
| 1 | 1 | 189.17 |
| 2 | 14 | −74.10 |
| 3 | 16 | 712.80 |

Numerical Example 5
Unit: mm

Surface data

| Surface number | r | d | nd | vd |
|---|---|---|---|---|
| 1* | 224.322 | 10.73 | 1.61700 | 62.8 |
| 2 | −2298.790 | 162.69 | | |
| 3 | 60.451 | 10.02 | 1.43387 | 95.1 |
| 4 | 3457.269 | 0.20 | | |
| 5 | 470.680 | 1.80 | 1.85478 | 24.8 |
| 6 | 47.276 | 0.43 | | |
| 7 | 47.033 | 8.32 | 1.43387 | 95.1 |
| 8 | 285.083 | 18.88 | | |
| 9 (stop) | ∞ | 2.00 | | |
| 10 | 47.188 | 4.96 | 1.89286 | 20.4 |
| 11 | 160.551 | 0.30 | | |
| 12 | 109.879 | 1.50 | 1.80420 | 46.5 |
| 13 | 30.776 | 6.91 | 1.43875 | 94.7 |
| 14 | 133.954 | 2.00 | | |
| 15 | 982.964 | 1.20 | 1.83481 | 42.7 |
| 16 | 57.866 | 16.29 | | |
| 17 | 165.576 | 2.99 | 1.43875 | 94.7 |
| 18 | −110.306 | 6.71 | | |
| 19 | 114.097 | 3.62 | 1.80000 | 29.8 |
| 20 | −76.911 | 1.30 | 1.69680 | 55.5 |
| 21 | 46.536 | 2.81 | | |
| 22 | −84.720 | 1.20 | 1.72916 | 54.7 |
| 23 | 121.397 | 4.81 | | |
| 24 | 36.775 | 4.45 | 1.54814 | 45.8 |
| 25 | 697.080 | 2.15 | | |
| 26 | ∞ | 2.00 | 1.51633 | 64.1 |
| 27 | ∞ | 17.17 | | |
| 28 | 130.003 | 4.29 | 1.61340 | 44.3 |
| 29 | −68.119 | 1.20 | 1.59522 | 67.7 |
| 30 | 28.425 | 0.20 | | |
| 31 | 28.460 | 12.04 | 1.66565 | 35.6 |
| 32 | −31.688 | 1.20 | 1.94595 | 18.0 |
| 33 | −164.733 | 2.36 | | |
| 34 | −45.396 | 1.40 | 1.43875 | 94.7 |
| 35 | 99.036 | 5.09 | 1.66565 | 35.6 |

-continued

Numerical Example 5
Unit: mm

| | | | | |
|---|---|---|---|---|
| 36 | −68.698 | 2.50 | | |
| 37 | −32.793 | 1.60 | 1.49700 | 81.6 |
| 38 | −65.842 | 55.71 | | |
| Image plane | ∞ | | | |

Aspherical surface data

First surface

K = 0.00000e+000  A4 = −8.67032e−009  A6 = −1.93063e−013  A8 = 3.23293e−018
A10 = −7.35981e−022

| | |
|---|---|
| Focal length | 489.83 |
| F-number | 4.12 |
| Half angle of view (°) | 2.53 |
| Image height | 21.64 |
| Total lens length | 385.02 |
| BF | 55.71 |
| d14 | 2.00 |
| d16 | 16.29 |
| d38 | 55.71 |

Lens unit data

| Group | Start surface | Focal length |
|---|---|---|
| 1 | 1 | 186.72 |
| 2 | 15 | −73.70 |
| 3 | 17 | 762.73 |

Numerical Example 6
Unit: mm

Surface data

| Surface number | r | d | nd | vd |
|---|---|---|---|---|
| 1* | 285.093 | 12.55 | 1.59349 | 67.0 |
| 2 | −1479.042 | 190.55 | | |
| 3 | 69.072 | 11.87 | 1.43387 | 95.1 |
| 4 | 685.012 | 0.20 | | |
| 5 | 228.115 | 1.80 | 1.85478 | 24.8 |
| 6 | 53.787 | 3.19 | | |
| 7 | 54.922 | 9.82 | 1.43387 | 95.1 |
| 8 | 244.661 | 12.90 | | |
| 9 | 56.988 | 6.15 | 1.89286 | 20.4 |
| 10 | 143.410 | 0.30 | | |
| 11 | 106.556 | 1.50 | 1.80420 | 46.5 |
| 12 | 36.998 | 11.01 | 1.43875 | 94.7 |
| 13 | 287.228 | 2.00 | | |
| 14 (stop) | ∞ | 1.89 | | |
| 15 | 2060.029 | 1.20 | 1.83481 | 42.7 |
| 16 | 63.704 | 31.52 | | |
| 17 | 288.621 | 3.43 | 1.43875 | 94.7 |
| 18 | −91.977 | 4.37 | | |
| 19 | 151.454 | 2.98 | 2.00069 | 25.5 |
| 20 | −154.501 | 1.30 | 1.72916 | 54.7 |
| 21 | 48.458 | 3.45 | | |
| 22 | −92.062 | 1.20 | 1.72916 | 54.7 |
| 23 | 97.879 | 2.62 | | |
| 24 | 74.517 | 3.90 | 1.71736 | 29.5 |
| 25 | −99.598 | 0.45 | | |
| 26 | −80.109 | 1.20 | 1.92286 | 20.9 |
| 27 | −120.673 | 15.00 | | |
| 28 | 125.923 | 6.79 | 1.61340 | 44.3 |
| 29 | −32.480 | 1.20 | 1.59522 | 67.7 |
| 30 | 49.025 | 0.20 | | |
| 31 | 43.296 | 6.42 | 1.66565 | 35.6 |
| 32 | −72.016 | 1.20 | 1.94595 | 18.0 |
| 33 | 151.132 | 2.00 | | |
| 34 | ∞ | 2.00 | 1.51633 | 64.1 |
| 35 | ∞ | 27.40 | | |
| 36 | 153.921 | 1.40 | 1.43875 | 94.7 |

Numerical Example 6
Unit: mm

| | | | | |
|---|---|---|---|---|
| 37 | 57.557 | 5.17 | 1.66565 | 35.6 |
| 38 | −437.624 | 2.66 | | |
| 39 | −60.164 | 1.60 | 1.49700 | 81.6 |
| 40 | −204.792 | 55.69 | | |
| Image plane | ∞ | | | |

Aspherical surface data

First surface

K = 0.00000e+000　　A4 = −6.76072e−009　　A6 = −8.09258e−014　　A8 = 9.85458e−019
A10 = −1.39258e−022

Various kinds of data

| | |
|---|---|
| Zoom ratio | 1.00 |
| Focal length | 584.73 |
| F-number | 4.12 |
| Half angle of view (°) | 2.12 |
| Image height | 21.64 |
| Total lens length | 452.08 |
| BF | 55.69 |

Lens unit data

| Group | Start surface | Focal length |
|---|---|---|
| 1 | 1 | 185.15 |
| 2 | 15 | −78.77 |
| 3 | 17 | 4600.69 |

Numerical Example 7
Unit: mm

Surface data

| Surface number | r | d | nd | vd |
|---|---|---|---|---|
| 1* | 225.654 | 11.32 | 1.59349 | 67.0 |
| 2 | 2469.202 | 184.69 | | |
| 3 | 98.977 | 12.83 | 1.43387 | 95.1 |
| 4 | −192.506 | 0.20 | | |
| 5 | −220.566 | 1.80 | 1.85478 | 24.8 |
| 6 | 164.470 | 1.00 | | |
| 7 | 83.667 | 7.41 | 1.43387 | 95.1 |
| 8 | 565.944 | 18.66 | | |
| 9 | 90.641 | 5.20 | 1.89286 | 20.4 |
| 10 | 2008.811 | 0.41 | | |
| 11 | −10922.623 | 1.20 | 1.80420 | 46.5 |
| 12 | 46.022 | 8.57 | 1.43875 | 94.7 |
| 13 | 676.931 | 2.00 | | |
| 14 | 646.937 | 1.62 | 1.80420 | 46.5 |
| 15 | 98.935 | 50.26 | | |
| 16 (stop) | ∞ | 22.00 | | |
| 17 | 207.606 | 2.09 | 1.43875 | 94.7 |
| 18 | −167.383 | 1.00 | | |
| 19 | 103.573 | 2.85 | 2.00069 | 25.5 |
| 20 | −153.956 | 1.76 | 1.72916 | 54.7 |
| 21 | 42.557 | 2.86 | | |
| 22 | −79.511 | 1.62 | 1.72916 | 54.7 |
| 23 | 92.583 | 2.50 | | |
| 24 | 59.043 | 2.74 | 1.62588 | 35.7 |
| 25 | −388.216 | 2.00 | | |
| 26 | 138.802 | 4.36 | 1.66565 | 35.6 |
| 27 | −35.745 | 1.20 | 1.59522 | 67.7 |
| 28 | 52.963 | 0.20 | | |
| 29 | 49.235 | 5.06 | 1.66565 | 35.6 |
| 30 | −45.137 | 1.20 | 1.94595 | 18.0 |
| 31 | 554.146 | 2.00 | | |
| 32 | ∞ | 2.00 | 1.51633 | 64.1 |
| 33 | ∞ | 30.69 | | |
| 34 | 147.955 | 5.79 | 1.51742 | 52.4 |
| 35 | −35.983 | 1.20 | 1.59522 | 67.7 |

-continued

Numerical Example 7
Unit: mm

| | | | | |
|---|---|---|---|---|
| 36 | −227.566 | 1.85 | | |
| 37 | −50.132 | 2.00 | 1.49700 | 81.5 |
| 38 | −99.040 | 82.90 | | |
| Image plane | ∞ | | | |

Aspherical surface data

First surface

K = 0.00000e+000   A4 = −6.52695e-010   A6 = −2.94089e-014   A8 = 6.84453e-019
A10 = −4.68155e-022

| | |
|---|---|
| Focal length | 789.82 |
| F-number | 5.88 |
| Half angle of view (°) | 1.57 |
| Image height | 21.64 |
| Total lens length | 489.04 |
| BF | 82.90 |

Lens unit data

| Group | Start surface | Focal length |
|---|---|---|
| 1 | 1 | 240.54 |
| 2 | 14 | −145.43 |
| 3 | 16 | −245.69 |

Numerical Example 8
Unit: mm

Surface data

| Surface number | r | d | nd | vd |
|---|---|---|---|---|
| 1 | 217.301 | 13.28 | 1.59349 | 67.0 |
| 2* | −3954.670 | 153.07 | | |
| 3 | 123.739 | 11.90 | 1.43387 | 95.1 |
| 4 | −164.195 | 0.28 | | |
| 5 | −159.815 | 2.00 | 1.85478 | 24.8 |
| 6 | 196.442 | 0.20 | | |
| 7 | 91.799 | 12.22 | 1.43387 | 95.1 |
| 8 | −143.545 | 0.20 | | |
| 9 | −151.037 | 2.10 | 1.80420 | 46.5 |
| 10 | 686.188 | 3.66 | | |
| 11 | 70.494 | 9.66 | 1.43387 | 95.1 |
| 12 | −1026.781 | 0.20 | | |
| 13 | 74.990 | 2.20 | 1.56040 | 44.7 |
| 14 | 42.795 | 11.82 | | |
| 15 (stop) | ∞ | 11.42 | | |
| 16 | 60.563 | 5.77 | 1.66305 | 33.7 |
| 17 | 522.937 | 4.40 | | |
| 18 | 96.483 | 4.00 | 1.84666 | 23.8 |
| 19 | −496.627 | 1.50 | 1.79576 | 44.7 |
| 20 | 38.172 | 5.68 | | |
| 21 | 99.376 | 4.45 | 1.84666 | 23.8 |
| 22 | −106.119 | 1.10 | 1.66368 | 49.0 |
| 23 | 58.316 | 2.94 | | |
| 24 | −153.332 | 1.10 | 1.74914 | 51.9 |
| 25 | 73.206 | 4.58 | | |
| 26 | 34.594 | 3.64 | 1.49700 | 81.5 |
| 27 | 76.678 | 1.18 | | |
| 28 | 239.545 | 1.10 | 1.98493 | 30.2 |
| 29 | 44.613 | 4.78 | 1.84666 | 23.8 |
| 30 | −375.542 | 18.48 | | |
| 31 | −48.459 | 1.10 | 1.43875 | 94.7 |
| 32 | 25.822 | 11.79 | 1.62004 | 36.3 |
| 33 | −267.592 | 0.20 | | |
| 34 | 61.776 | 11.45 | 1.61340 | 44.3 |
| 35 | −34.301 | 1.10 | 1.95906 | 17.5 |

-continued

Numerical Example 8
Unit: mm

| | | | | |
|---|---|---|---|---|
| 36 | −117.040 | 12.31 | | |
| 37 | −28.824 | 1.10 | 1.94595 | 18.0 |
| 38 | −42.636 | (variable) | | |
| Image plane | 32.32 | | | |

Aspherical surface data

Second surface

K = 0.00000e+000   A4 = 4.49620e−009   A6 = −4.48946e−014   A8 = −9.10918e−018
A10 = 8.90247e−022

| | |
|---|---|
| Focal length | 390.15 |
| F-number | 2.91 |
| Half angle of view (°) | 3.17 |
| Image height | 21.64 |
| Total lens length | 370.27 |
| BF | 32.32 |

Lens unit data

| Group | Start surface | Focal length |
|---|---|---|
| 1 | 1 | 361.39 |
| 2 | 16 | 102.79 |
| 3 | 18 | −55.59 |

TABLE 1

| | Conditional Expression | First Exemplary Embodiment | Second Exemplary Embodiment | Third Exemplary Embodiment | Fourth Exemplary Embodiment |
|---|---|---|---|---|---|
| (1) | LD/f | 0.9513 | 0.9374 | 0.8897 | 0.7860 |
| (2) | Dpn/LD | 0.4462 | 0.3850 | 0.4814 | 0.4512 |
| (3) | Ndp1 | 1.59349 | 1.59349 | 1.49700 | 1.61800 |
| (4) | vdp1 | 67.00 | 67.00 | 81.54 | 63.40 |
| (5) | Ndp2 | 1.43387 | 1.43387 | 1.43387 | 1.43387 |
| (6) | vdp2 | 95.10 | 95.10 | 95.10 | 95.10 |
| (7) | Ndp3 | 1.43387 | 1.43387 | 1.43387 | 1.43387 |
| (8) | vdp3 | 95.10 | 95.10 | 95.10 | 95.10 |
| (9) | Ndp4 | 1.43875 | 1.43875 | 1.51742 | 1.43875 |
| (10) | vdp4 | 94.66 | 94.66 | 52.43 | 94.66 |
| (11) | Ndn1 | 1.85478 | 1.85478 | 1.85478 | 1.85478 |
| (12) | vdn1 | 24.80 | 24.80 | 24.80 | 24.80 |
| (13) | Ndn2 | 1.43875 | 1.43875 | 1.43875 | 1.43875 |
| (14) | vdn2 | 94.66 | 94.66 | 94.66 | 94.66 |
| (15) | Ndn3 | 1.94595 | 1.94595 | 1.94595 | 1.94595 |
| (16) | vdn3 | 17.98 | 17.98 | 17.98 | 17.98 |
| (17) | fl/f | 0.8240 | 0.4164 | 0.4281 | 0.3862 |
| (18) | DRGp1 × Fno/f | 0.00061 | 0.00080 | 0.00083 | 0.00020 |
| (19) | (rp2 + rp1)/ (rp2 − rp1) | 0.4043 | 0.4554 | 0.4644 | 0.8641 |
| (20) | fl1/f | 0.8561 | 0.7940 | 0.7797 | 0.6772 |
| (21) | d12/f11 | 0.4653 | 0.4059 | 0.5099 | 0.4929 |
| (22) | YASPH | 66.989 | 50.223 | 66.990 | 59.445 |

| | Conditional Expression | Fifth Exemplary Embodiment | Sixth Exemplary Embodiment | Seventh Exemplary Embodiment | Eighth Exemplary Embodiment |
|---|---|---|---|---|---|
| (1) | LD/f | 0.7860 | 0.7731 | 0.6192 | 0.9491 |
| (2) | Dpn/LD | 0.4491 | 0.4482 | 0.4043 | 0.4463 |
| (3) | Ndp1 | 1.61700 | 1.59349 | 1.59349 | 1.59349 |
| (4) | vdp1 | 62.83 | 67.00 | 67.00 | 67.00 |
| (5) | Ndp2 | 1.43387 | 1.43387 | 1.43387 | 1.43387 |
| (6) | vdp2 | 95.10 | 95.10 | 95.10 | 95.10 |
| (7) | Ndp3 | 1.43387 | 1.43387 | 1.43387 | 1.43387 |
| (8) | vdp3 | 95.10 | 95.10 | 95.10 | 95.10 |
| (9) | Ndp4 | 1.43875 | 1.43875 | 1.43875 | 1.49700 |
| (10) | vdp4 | 94.66 | 94.66 | 94.66 | 81.54 |
| (11) | Ndn1 | 1.85478 | 1.85478 | 1.85478 | 1.85478 |
| (12) | vdn1 | 24.80 | 24.80 | 24.80 | 24.80 |

TABLE 1-continued

| | | | | | |
|---|---|---|---|---|---|
| (13) | Ndn2 | 1.43875 | 1.43875 | 1.49700 | 1.43875 |
| (14) | vdn2 | 94.66 | 94.66 | 81.54 | 94.66 |
| (15) | Ndn3 | 1.94595 | 1.94595 | 1.94595 | 1.95906 |
| (16) | vdn3 | 17.98 | 17.98 | 17.98 | 17.47 |
| (17) | f1/f | 0.3812 | 0.3166 | 0.3045 | 0.9263 |
| (18) | DRGp1 × Fno/f | 0.00022 | 0.00029 | 0.00003 | 0.00014 |
| (19) | (rp2 + rp1)/ (rp2 − rp1) | 0.8222 | 0.6768 | 1.2012 | 0.8958 |
| (20) | f11/f | 0.6773 | 0.6906 | 0.5288 | 0.8906 |
| (21) | d12/f11 | 0.4904 | 0.4719 | 0.4422 | 0.4405 |
| (22) | YASPH | 59.445 | 70.961 | 67.160 | 66.726 |

Exemplary Embodiment of Imaging Apparatus

Figure 17:
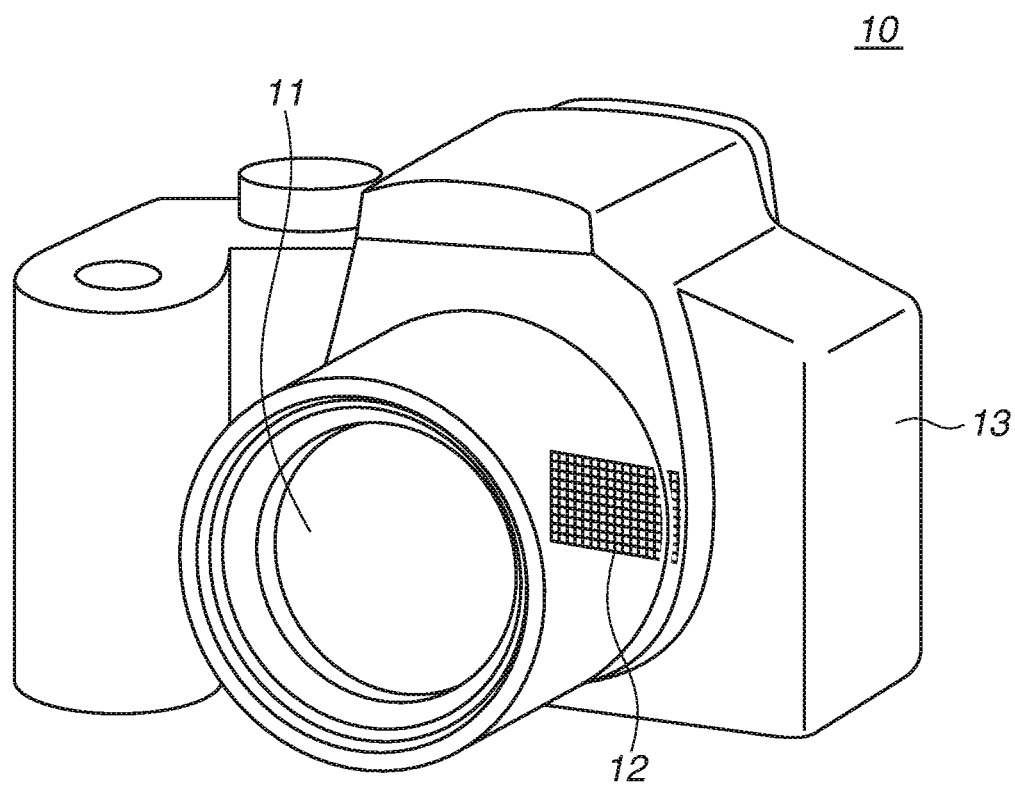
FIG. 17 is a schematic diagram of an imaging apparatus.

Next, an embodiment of an imaging apparatus will be described with reference to FIG. 17. FIG. 17 is a diagram illustrating a configuration of an imaging apparatus 10. The imaging apparatus 10 includes a camera main body 13, a lens apparatus 11 including the optical system L0 according to any of the above-described first to eighth embodiments, and an image sensor (light receiving element) 12 that photoelectrically converts an image formed by the optical system L0. As the image sensor 12, an image sensor such as a CCD sensor or a CMOS sensor can be used. The lens apparatus 11 and the camera main body 13 may be integrally formed, or may be detachably formed. The imaging apparatus 10 according to the present embodiment is compact and lightweight, and can obtain high optical performance An imaging apparatus according to an embodiment of the present invention is not limited to the digital still camera illustrated in FIG. 17, and the present invention can be applied to various imaging apparatuses such as a broadcasting camera, a silver salt film camera, and a monitoring camera.

Heretofore, embodiments of the present invention have been described, but the present invention is not limited to these embodiments, and various combinations, modifications, and changes can be made without departing from the scope thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-144633, filed Aug. 6, 2019, and Japanese Patent Application No. 2020-090687, filed May 25, 2020 which are hereby incorporated by reference herein in their entirety.

What is claimed is:

1. An optical system comprising:
   one or more positive lenses; and
   one or more negative lenses, wherein a positive lens disposed closest to an object among the one or more positive lenses is a first positive lens, and a negative lens that is disposed on an image side of the first positive lens and disposed closest to the object among the one or more negative lenses is a first negative lens,
   wherein at least one of an object side surface and an image side surface of the first positive lens is an aspherical surface, and wherein the following conditional expressions are satisfied:

$0.20 < LD/f < 1.00$, $0.382 < Dpn/LD < 0.800$, and $0.00001 < DRGp1 \times Fno < 0.00500$, where LD is a total lens length of the optical system, f is a focal length of the optical system, Dpn is a distance on an optical axis from the image side surface of the first positive lens to an object side surface of the first negative lens, DRGp1 is an aspherical surface amount at a 70% position of an effective diameter of the aspherical surface, and Fno is an F-number of the optical system.

2. The optical system according to claim 1, wherein the following conditional expressions are satisfied:

$1.493 < Ndp1 < 1.700$, and $55.0 < vdp1 < 96.0$, where Ndp1 is a refractive index with respect to a d-line of material of the first positive lens, and vdp1 is an Abbe number based on the d-line of the material.

3. The optical system according to claim 1,
   wherein the optical system comprises two or more positive lenses, and a positive lens disposed second from an object side among the two or more positive lenses is a second positive lens, and
   wherein the following conditional expressions are satisfied:

$1.400 < Ndp2 < 1.630$, and $61.0 < vdp2 < 96.0$, where Ndp2 is a refractive index with respect to a d-line of material of the second positive lens, and vdp2 is an Abbe number based on the d-line of the material.

4. The optical system according to claim 1,
   wherein the optical system comprises three or more positive lenses, and a positive lens disposed third from an object side among the three or more positive lenses is a third positive lens, and
   wherein the following conditional expressions are satisfied:

$1.400 < Ndp3 < 1.630$, and $61.0 < vdp3 < 96.0$, where Ndp3 is a refractive index with respect to a d-line of material of the third positive lens, and vdp3 is an Abbe number based on the d-line of the material.

5. The optical system according to claim 1,
   wherein the optical system comprises four or more positive lenses, and a positive lens disposed on an image side of a third positive lens disposed third from an object side among the four or more positive lenses is a fourth positive lens, and wherein the following conditional expressions are satisfied:

$1.400 < Ndp4 < 1.630$ and $50.0 < vdp4 < 96.0$, where Ndp4 is a refractive index with respect to a d-line of material of the fourth positive lens, and vdp4 is an Abbe number based on the d-line of the material.

6. The optical system according to claim 1, wherein the following conditional expressions are satisfied:

$1.600 < Ndn1 < 1.950$, and $20.0 < vdn1 < 50.0$, where Ndn1 is a refractive index with respect to a d-line of material of the first negative lens, and vdn1 is an Abbe number based on the d-line of the material.

7. The optical system according to claim 1, wherein the optical system consists of a first lens unit having positive refractive power and not moving for focusing, a second lens unit having positive or negative refractive power and moving for focusing, and a third lens unit having positive or negative refractive power and not moving for focusing, which are disposed in order from an object side to an image side.

8. The optical system according to claim 7, wherein the optical system comprises four or more positive lenses are included, and a positive lens disposed on an image side of a third positive lens disposed third from the object side among the four or more positive lenses is a fourth positive lens, the third lens unit includes the fourth positive lens, and a negative lens disposed on an image side of the fourth positive lens.

9. The optical system according to claim 8,
wherein the third lens unit includes a second negative lens disposed on the image side of the fourth positive lens, and
wherein the following conditional expressions are satisfied:

$1.400 < Ndn2 < 1.630$, and $61.0 < vdn2 < 96.0$, where Ndn2 is a refractive index with respect to a d-line of material of the second negative lens, and vdn2 is an Abbe number based on the d-line of the material.

10. The optical system according to claim 8,
wherein the third lens unit includes a third negative lens disposed on the image side of the fourth positive lens, and
wherein the following conditional expressions are satisfied:

$1.800 < Ndn3 < 2.200$, and $14.0 < vdn3 < 24.0$, where Ndn3 is a refractive index with respect to a d-line of material of the third negative lens, and vdn3 is an Abbe number based on the d-line of the material.

11. The optical system according to claim 7, wherein the following conditional expression is satisfied:

$0.10 < f1/f < 1.20$, where f1 is a focal length of the first lens unit.

12. The optical system according to claim 7, wherein the second lens unit has positive refractive power and the third lens unit has negative refractive power, and wherein the second lens unit moves toward an object side for focusing from an infinite-distance object to a closest-distance object.

13. The optical system according to claim 7, wherein the second lens unit has negative refractive power, and the third lens unit has positive refractive power, and wherein the second lens unit moves toward the image side for focusing from an infinite-distance object to a closest-distance object.

14. The optical system according to claim 7, wherein the second lens unit has negative refractive power and the third lens unit has negative refractive power, and wherein the second lens unit moves toward the image side for focusing from an infinite-distance object to a closest-distance object.

15. The optical system according to claim 7, wherein the second lens unit consists of three or less lenses.

16. The optical system according to claim 1, wherein the following conditional expression is satisfied:

$0.10 < (rp2+rp1)/(rp2-rp1) < 2.00$, where rp1 is a curvature radius of the object side surface of the first positive lens, and rp2 is a curvature radius of the image side surface of the first positive lens.

17. The optical system according to claim 1, wherein the following conditional expression is satisfied:

$0.20 < f11/f < 2.00$, where f11 is a focal length of the first positive lens.

18. The optical system according to claim 1,
wherein the optical system comprises two or more positive lenses, and a positive lens disposed second from an object side among the two or more positive lenses is a second positive lens, and
wherein the following conditional expression is satisfied:

$0.20 < d12/f11 < 0.60$, where d12 is a distance on an optical axis from an image side surface of the first positive lens to an object side surface of the second positive lens, and f11 is a focal length of the first positive lens.

19. The optical system according to claim 1, wherein the optical system comprises the first positive lens, a second positive lens, the first negative lens, and a third positive lens which are consecutively disposed in order from an object side to an object to the image side.

20. The optical system according to claim 1, wherein the aspherical surface has a shape having negative refractive power that gets stronger from a surface vertex toward a circumference.

21. An imaging apparatus comprising:
the optical system according to claim 1; and
an image sensor configured to receive an image formed by the optical system.

22. An optical system, comprising:
one or more positive lenses; and
one or more negative lenses,
wherein a positive lens disposed closest to an object among the one or more positive lenses is a first positive lens, and a negative lens that is disposed on an image side of the first positive lens and disposed closest to the object among the one or more negative lenses is a first negative lens,
wherein at least one of an object side surface and an image side surface of the first positive lens is an aspherical surface, and wherein the following conditional expressions are satisfied:

$0.21 < LD/f < 1.00$, $0.382 < Dpn/LD < 0.800$, and $30 < YASPH < 100$, where LD is a total length of the optical system, f is a focal length of the optical system, Dpn is a distance on an optical axis from the image side surface of the first positive lens to an object side surface of the first negative lens, and YASPH (mm) is a maximum height of an incident point on the aspherical surface of an on-axis ray in an in-focus state on an infinite-distance object.

* * * * *